(12) United States Patent
Kim et al.

(10) Patent No.: US 12,448,471 B2
(45) Date of Patent: Oct. 21, 2025

(54) ETHYLENE/1-HEXENE COPOLYMER HAVING IMPROVED FLEXIBILITY AND PROCESSIBILITY

(71) Applicant: LG CHEM, LTD., Seoul (KR)

(72) Inventors: Joongsoo Kim, Daejeon (KR); Yeonsoo Kim, Daejeon (KR); Changsub Kim, Daejeon (KR); Bog Ki Hong, Daejeon (KR); Ye Jin Lee, Daejeon (KR); Jinmo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 751 days.

(21) Appl. No.: 17/773,027

(22) PCT Filed: Sep. 29, 2021

(86) PCT No.: PCT/KR2021/013322
§ 371 (c)(1),
(2) Date: Apr. 28, 2022

(87) PCT Pub. No.: WO2022/071744
PCT Pub. Date: Apr. 7, 2022

(65) Prior Publication Data
US 2022/0403074 A1  Dec. 22, 2022

(30) Foreign Application Priority Data

Sep. 29, 2020 (KR) .................. 10-2020-0127478
Sep. 28, 2021 (KR) .................. 10-2021-0128313

(51) Int. Cl.
*C08F 210/16* (2006.01)
*C08F 2/01* (2006.01)
*C08F 4/659* (2006.01)

(52) U.S. Cl.
CPC .............. *C08F 210/16* (2013.01); *C08F 2/01* (2013.01); *C08F 4/65916* (2013.01)

(58) Field of Classification Search
CPC ..................................................... C08F 210/16
See application file for complete search history.

(56) References Cited

U.S. PATENT DOCUMENTS

| | | |
|---|---|---|
| 4,935,474 A | 6/1990 | Ewen et al. |
| 6,180,736 B1 | 1/2001 | Muhle et al. |
| 6,841,631 B2 | 1/2005 | Loveday et al. |

(Continued)

FOREIGN PATENT DOCUMENTS

| | | |
|---|---|---|
| JP | 2016-537444 A | 12/2016 |
| JP | 2017-530201 A | 10/2017 |

(Continued)

OTHER PUBLICATIONS

KR-20110015737-A; Feb. 17, 2011; machine translation. (Year: 2011).*

(Continued)

*Primary Examiner* — Rip A Lee
(74) *Attorney, Agent, or Firm* — Morgan, Lewis & Bockius LLP

(57) ABSTRACT

The present disclosure relates to an ethylene/1-hexene copolymer having excellent flexibility and processability and useful for manufacturing high-pressure heating pipes, PE-RT pipes or large-diameter pipes.

17 Claims, 4 Drawing Sheets

(56) References Cited

U.S. PATENT DOCUMENTS

| | | |
|---|---|---|
| 6,894,128 B2 | 5/2005 | Loveday et al. |
| 6,911,508 B2 | 6/2005 | McCullough |
| 2003/0148877 A1 | 8/2003 | Nifant'ev et al. |
| 2010/0121006 A1 | 5/2010 | Cho et al. |
| 2016/0237187 A1 | 8/2016 | Hong et al. |
| 2016/0280822 A1 | 9/2016 | Kim et al. |
| 2016/0347874 A1 | 12/2016 | Boller et al. |
| 2018/0223009 A1 | 8/2018 | Kim et al. |
| 2018/0305481 A1 | 10/2018 | Yu et al. |
| 2019/0127503 A1 | 5/2019 | Joung et al. |
| 2019/0144575 A1 | 5/2019 | Lue et al. |
| 2020/0115475 A1 | 4/2020 | Im et al. |
| 2020/0231717 A1 | 7/2020 | Kim et al. |

FOREIGN PATENT DOCUMENTS

| | | | |
|---|---|---|---|
| JP | 2019-163476 A | 9/2019 | |
| JP | 2020-117678 A | 8/2020 | |
| KR | 10-2000-0069979 A | 11/2000 | |
| KR | 10-2008-0097949 A | 11/2008 | |
| KR | 2011-0015737 A | * 2/2011 | ............ C08F 210/16 |
| KR | 10-2015-0045369 A | 4/2015 | |
| KR | 10-2016-0029704 A | 3/2016 | |
| KR | 10-2016-0121045 A | 10/2016 | |
| KR | 10-1692346 B1 | 1/2017 | |
| KR | 10-2017-0049272 A | 5/2017 | |
| KR | 10-2017-0105407 A | 9/2017 | |
| KR | 10-2018-0063669 A | 6/2018 | |
| KR | 10-2019-0073264 A | 6/2019 | |
| KR | 10-2020-0075963 A | 6/2020 | |
| WO | 2016/163810 A1 | 10/2016 | |
| WO | 2020/130452 A1 | 6/2020 | |

OTHER PUBLICATIONS

International Search Report (with translation) and Written Opinion dated Jan. 12, 2022, issued in corresponding International Patent Application No. PCT/KR2021/013322.

Alexakis, et al., "Mild Protection and Deprotection of Alcohols as ter-Butyl Ethers in the Field of Pheromone Synthesis," Tetrahedron Letters, vol. 29, No. 24, pp. 2951-2954, 1988.

Extended European Search Report issued in corresponding European Patent Application No. 21876019.7 dated Dec. 20, 2022.

* cited by examiner

[FIG. 1]
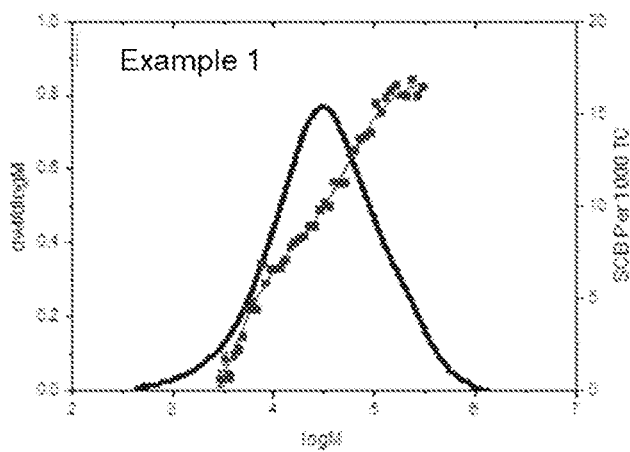
[FIG. 2]
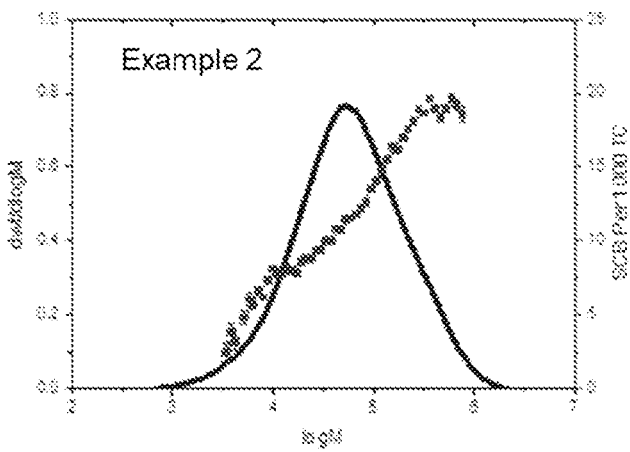

[FIG. 3]
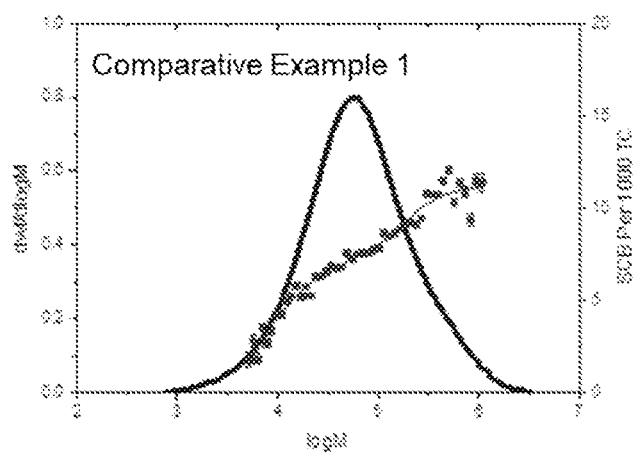
[FIG. 4]
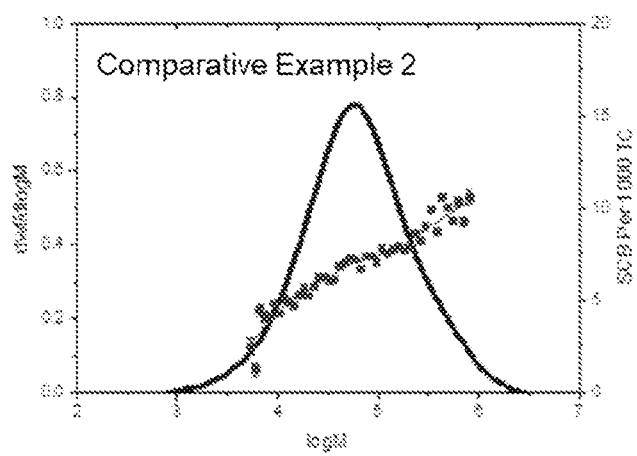

[FIG. 5]
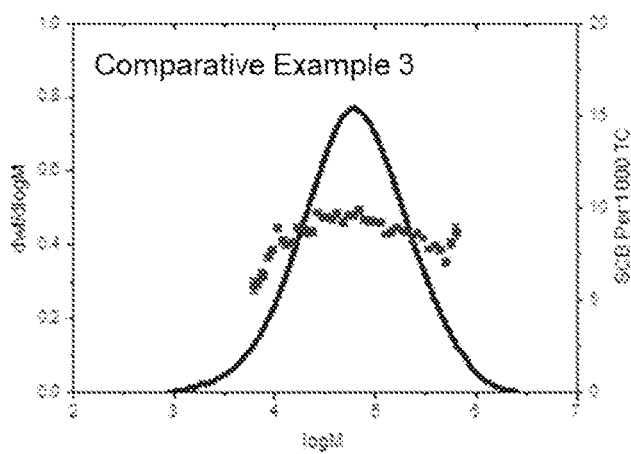
[FIG. 6]
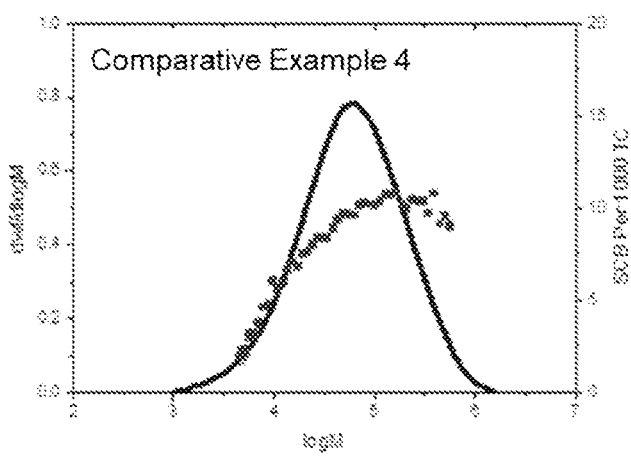

[FIG. 7]
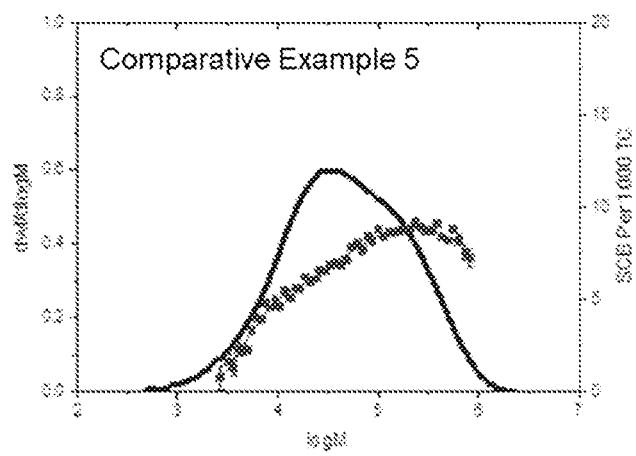
[FIG. 8]
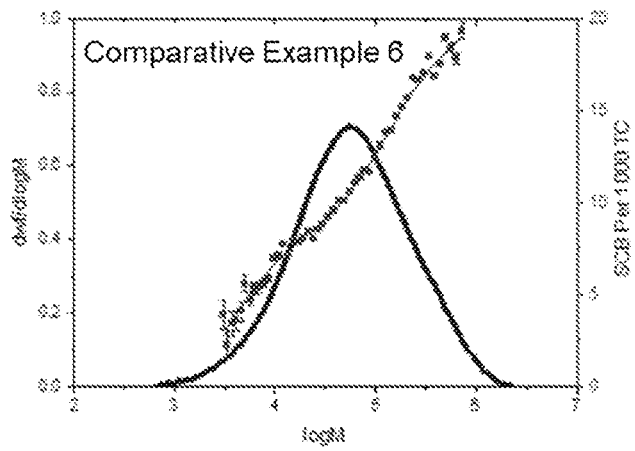

ETHYLENE/1-HEXENE COPOLYMER HAVING IMPROVED FLEXIBILITY AND PROCESSIBILITY

CROSS-REFERENCE TO RELATED APPLICATION(S)

This application claims the benefit of Korean Patent Applications No. 10-2020-0127478 filed on Sep. 29, 2020 and No. 10-2021-0128313 filed on Sep. 28, 2021 with the Korean Intellectual Property Office, the disclosures of which are incorporated herein by reference in their entirety.

TECHNICAL FIELD

The present disclosure relates to an ethylene/1-hexene copolymer having excellent flexibility and processability.

BACKGROUND OF ART

Polyolefin resins used for high-pressure heating pipes or PE-RT pipes require high flexibility and excellent processability in order to improve workability. However, there is a trade-off relationship between high flexibility and processability in terms of product properties. High flexibility requires lowering the density of the product, which leads to a drop in internal pressure, resulting in deteriorated processability. In addition, when mechanical properties are increased and the density of the product is increased to secure processability, flexibility is lowered and workability is deteriorated.

U.S. Pat. No. 6,180,736 discloses a method of preparing a polyethylene in a single gas phase reactor or a continuous slurry reactor by using one type of metallocene catalyst. When this method is used, there are advantages in that the production cost of polyethylene is low, fouling does not occur, and polymerization activity is stable. In addition, U.S. Pat. No. 6,911,508 discloses the preparation of a polyethylene that is polymerized in a single gas phase reactor and has improved rheological properties by using a novel metallocene catalyst compound and 1-hexene as a comonomer. However, since the polyethylene that is generated in the above-mentioned patents has a narrow molecular weight distribution, there are disadvantages in that it is difficult to secure sufficient impact strength and processability.

In addition, U.S. Pat. No. 4,935,474 discloses a method of preparing a polyethylene having a wide molecular weight distribution by using two or more metallocene compounds.

Meanwhile, U.S. Pat. Nos. 6,841,631 and 6,894,128 disclose that a polyethylene having a bimodal or multimodal molecular weight distribution is prepared by using a metallocene catalyst containing at least two metal compounds, thus being used for films, pipes, and blow molded products. However, even though the polyethylene as prepared above has improved processability, the dispersion state according to the molecular weight in a unit particle is not uniform, and thus the appearance is rough and physical properties are not stable under relatively desirable processing conditions.

Against this background, there is a constant demand for the preparation of better resins with a balance between high flexibility and high pressure resistance for excellent processability in order to improve workability, and further research on this is required.

DETAILED DESCRIPTION OF THE INVENTION

Technical Problem

In order to solve the problems of the prior art, there is provided an ethylene/1-hexene copolymer having excellent flexibility and processability.

There is also provided a pipe manufactured using the ethylene/1-hexene copolymer.

Technical Solution

In order to solve the above problem, according to an embodiment of the present disclosure, there is provided an ethylene/1-hexene copolymer having a density measured according to ASTM D 1505 of 0.915 g/cm³ to 0.935 g/cm³, a BOCD (Broad Orthogonal Co-monomer Distribution) index of 5.5 or more, and a molecular weight distribution (Mw/Mn) of 3.5 or more.

According to another embodiment of the present disclosure, there is provided a method for preparing the ethylene/1-hexene copolymer, including the step of copolymerizing ethylene and 1-hexene in a mono-modal polymerization process in the presence of a catalyst composition containing a first metallocene compound represented by the following Chemical Formula 1 and a second metallocene compound represented by the following Chemical Formula 2 while introducing hydrogen gas:

$$(Cp^1R^a)_n(Cp^2R^b)M^1Z^1_{3-n} \quad \text{[Chemical Formula 1]}$$

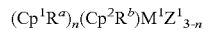

in Chemical Formula 1,
$M^1$ is a Group 4 transition metal;
each of $Cp^1$ and $Cp^2$ is cyclopentadienyl unsubstituted or substituted with $C_{1-20}$ hydrocarbyl;
$R^a$ and $R^b$ are the same as or different from each other, and are each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, $C_{2-20}$ alkynyl, or substituted or unsubstituted $C_{2-20}$ heteroaryl containing at least one heteroatom selected from the group consisting of N, O and S, provided that at least one of $R^a$ and $R^b$ is not hydrogen;
$Z^1$ are each independently halogen, $C_{1-20}$ alkyl, $C_{2-20}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy; and
n is 1 or 0;

[Chemical Formula 2]

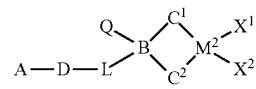

in Chemical Formula 2,
A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl;
D is —O—, —S—, —N(R)—, or —Si(R)(R')—, wherein R and R' are the same or different from each other, and are each independently hydrogen, halogen, $C_{1-20}$ alkyl, $C_{2-20}$ alkenyl, or $C_{6-20}$ aryl;
L is $C_{1-10}$ linear or branched alkylene;
B is carbon, silicon, or germanium;
Q is hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;
$M^2$ is a Group 4 transition metal;
$X^1$ and $X^2$ are the same as or different from each other, and are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate; and $C^1$ and $C^2$ are the same as or different from each other, and are each independently represented by one of Chemical Formula 2a, Chemical Formula 2b, or Chemical Formula 2c, except that both of $C^1$ and $C^2$ are represented by Chemical Formula 2c;

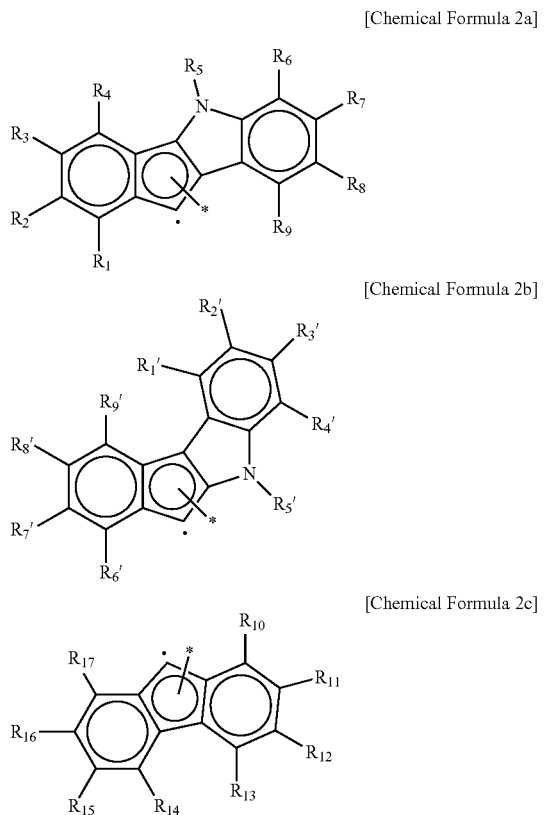

[Chemical Formula 2a]

[Chemical Formula 2b]

[Chemical Formula 2c]

in Chemical Formulae 2a, 2b, and 2c, $R_1$ to $R_{17}$ and $R_1'$ to $R_9'$ are the same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and two or more substituents adjacent to each other of $R_{10}$ to $R_{17}$ may be connected with each other to form a substituted or unsubstituted aliphatic or aromatic ring;

· represents a site of binding to B; and

* represents a site of binding to $M^2$.

According to another embodiment of the present disclosure, there is also provided a pipe manufactured using the ethylene/1-hexene copolymer.

Advantageous Effects

The ethylene/1-hexene copolymer according to the present disclosure has improved flexibility and processability by controlling a ratio of high molecular polymer and low molecular polymer in the molecule, and as a result, it can be applied to high-pressure heating pipes, PE-RT pipes or large-diameter pipes.

BRIEF DESCRIPTION OF THE DRAWINGS

FIG. 1 shows a GPC curve (solid line) and a SCB content graph (square dotted line) of the ethylene/1-hexene copolymer prepared in Example 1 according to an embodiment of the present disclosure.

FIG. 2 shows a GPC curve (solid line) and a SCB content graph (square dotted line) of the ethylene/1-hexene copolymer prepared in Example 2 according to an embodiment of the present disclosure.

FIG. 3 shows a GPC curve (solid line) and a SCB content graph (square dotted line) of the ethylene/1-hexene copolymer according to Comparative Example 1.

FIG. 4 shows a GPC curve (solid line) and a SCB content graph (square dotted line) of the ethylene/1-hexene copolymer according to Comparative Example 2.

FIG. 5 shows a GPC curve (solid line) and a SCB content graph (square dotted line) of the ethylene/1-hexene copolymer according to Comparative Example 3.

FIG. 6 shows a GPC curve (solid line) and a SCB content graph (square dotted line) of the ethylene/1-hexene copolymer according to Comparative Example 4.

FIG. 7 shows a GPC curve (solid line) and a SCB content graph (square dotted line) of the ethylene/1-hexene copolymer according to Comparative Example 5.

FIG. 8 shows a GPC curve (solid line) and a SCB content graph (square dotted line) of the ethylene/1-hexene copolymer according to Comparative Example 6.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

The ethylene/1-hexene copolymer according to an embodiment of the present disclosure has a density measured according to ASTM D 1505 of 0.915 g/cm³ to 0.935 g/cm³, a BOCD (Broad Orthogonal Co-monomer Distribution) index of 5.5 or more, and a molecular weight distribution (Mw/Mn) of 3.5 or more.

In general, in order to improve flexibility in high-pressure heating pipes or PE-RT pipes to which a polyolefin resin is applied, high flexibility and excellent processability are required. However, there is a trade-off relationship between the high flexibility and processability in terms of product properties. High flexibility requires lowering a density of the product, which leads to a drop in pressure resistance, resulting in deteriorated processability. In addition, when mechanical properties and the density of the product are increased to secure processability, flexibility properties are lowered, resulting in deteriorated flexibility.

In the present disclosure, a hybrid supported metallocene catalyst containing two metallocene compounds that exhibits low comonomer incorporation in the low molecular weight region and high comonomer incorporation in the high molecular weight region with respect to 1-hexene is used to simultaneously control the ratio of low molecular weight polymer and high molecular weight polymer in the polymer. In addition, this copolymerization process is performed in a mono-modal polymerization process using a single reactor, that is, a uni-modal polymerization process. With this process, the BOLD structure was reinforced while having mechanical properties equivalent to those of the ethylene/1-hexene copolymer produced by a multi-modal polymerization process, and thus high flexibility and improved processability were secured at the same time.

Specifically, the ethylene/1-hexene copolymer according to an embodiment of the present disclosure has a density of 0.915 g/cm$^3$ to 0.935 g/cm$^3$, when measured in accordance with ASTM D 1505. In particular, when the density is less than 0.915 g/cm$^3$, there is a risk of a decrease in the pressure resistance, and when it exceeds 0.935 g/cm$^3$, there is a risk of a decrease in FNCT (full notch creep test). When having the density within the above range, it is possible to improve FNCT without concern about the decrease in the pressure resistance or occurrence of problems. More specifically, the density of the ethylene/1-hexene copolymer may be 0.918 g/cm$^3$ or more, or 0.920 g/cm$^3$ or more, and 0.934 g/cm$^3$ or less, or 0.932 g/cm$^3$ or less. In particular, the density of the ethylene/1-hexene copolymer may be within the above-mentioned range in terms of improving flexibility and securing excellent pressure resistance during pipe processing.

In addition, the ethylene/1-hexene copolymer has a BOCD (Broad Orthogonal Co-monomer Distribution) index of 5.5 or more, or 5.5 to 10.

In the present disclosure, the BOCD structure means a structure in which comonomers such as alpha-olefin are incorporated predominantly in high-molecular-weight main chains, that is, a structure in which the SCB (short chain branch) content increases as the molecular weight increases.

Herein, the short chain branch (SCB) refers to a branch having 2 to 7 carbon atoms.

The weight average molecular weight, molecular weight distribution, and SCB content are measured simultaneously and continuously by GPC-FTIR instrument, and the BOLD index may be calculated based on the following Equation 1 through a molecular weight distribution curve obtained by plotting a log value (log M) of a weight average molecular weight (M) on the x-axis, and a molecular weight distribution (dwt/d log M) with respect to the log value on the y-axis, and then measuring the SCB (short chain branch) content (content of branches having 2 to 7 carbon atoms per 1,000 carbons, unit: branch/1,000C) at the left and right borders of centered 60% area excluding 20% of the left and right ends in the total area. In this regard, the SCB content at high molecular weight side and the SCB content at low molecular weight side mean SCB content values at the left and right borders of centered 60% area excluding 20% of the left and right ends, respectively.

[Equation 1]

$$BOCD\ Index = \frac{(SCB\ content\ at\ high\ molecular\ weight\ side - SCB\ content\ at\ low\ molecular\ weight\ side)}{(SCB\ content\ at\ low\ molecular\ weight\ side)}$$

If the BOLD index is 0 or less, it can be considered that the polymer has no BOLD structure, and if the BOLD index is more than 0, it can be considered that the polymer has the BOLD structure. The larger the value, the higher the SCB (short chain branch) content at high molecular weight side.

As the ethylene/1-hexene copolymer according to an embodiment of the present disclosure has a BOLD index of 5.5 to 10, it has high comonomer content at the high molecular weight side, and as a result, may exhibit excellent pressure resistance and FNCT. More specifically, the ethylene/1-hexene copolymer may have a BOLD index of 6 or more, or 6.5 or more, and 9.5 or less, or 9 or less. The BOLD index of the ethylene/1-hexene copolymer may be within the above-described range in terms of improving flexibility and securing excellent pressure resistance during pipe processing.

Specifically, the ethylene/1-hexene copolymer exhibits a broad molecular weight distribution (Mw/Mn, PDI) of 3.5 or more, or 3.5 to 5, and as a result, it can exhibit excellent physical properties and processability. More specifically, the ethylene/1-hexene copolymer may have a molecular weight distribution of about 3.52 or more, about 3.55 or more, about 3.6 or more, about 3.62 or more, or about 3.65 or more, and about 4.98 or less, about 4.95 or less, about 4.92 or less, about 4.9 or less, about 4.88 or less, or 4.85 or less. The molecular weight distribution of the ethylene/1-hexene copolymer may be within the above-mentioned range in terms of securing excellent internal pressure while improving flexibility and processability during pipe processing.

In addition, with the above molecular weight distribution, the ethylene/1-hexene copolymer may has a weight average molecular weight (Mw) of 10,000 g/mol or more, or 100,000 g/mol or more, and 400,000 g/mol or less, or 300,000 g/mol or less.

In general, polymers prepared using metallocene catalysts have a trade-off relationship between processability and mechanical properties depending on the weight average molecular weight. That is, when the weight average molecular weight is increased, the mechanical properties are improved but the processability is decreased. And when the weight average molecular weight is decreased, the processability is improved but the mechanical properties are decreased. However, the ethylene-1-hexene copolymer has a weight average molecular weight within the above range, and thus may exhibit improved processability and mechanical properties with a good balance.

Meanwhile, the molecular weight distribution may be obtained by measuring the weight average molecular weight (Mw) and the number average molecular weight (Mn) of the ethylene/1-hexene copolymer, and then calculating a ratio of the weight average molecular weight to the number average molecular weight (Mw/Mn). In addition, the weight average molecular weight and the number average molecular weight can be measured using gel permeation chromatography (GPC), and a specific measurement method will be described in more detail in Test Examples below.

In addition, the ethylene/1-hexene copolymer has a SCB (short chain branch) content, that is, a content of branches having 2 to 7 carbon atoms per 1000 carbons (unit: branch/1000C) of 9.5 to 20. More specifically, the ethylene/1-hexene copolymer may have the SCB (short chain branch) content of 10 branches/1000C or more, or 10.5 branches/1000C or more, and 19 branches/1000C or less, or 18 branches/cm$^2$ or less. For example, the SCB content of the ethylene/1-hexene copolymer may be measured by the above-described method for measuring the BOLD index, and a specific measurement method will be described in more detail in Test Examples below.

In addition, the ethylene/1-hexene copolymer has a melt index ($MI_{2.16}$) of 0.50 g/10 min to 0.70 g/10 min when measured at 190° C. under a load of 2.16 kg in accordance with ASTM D 1238. When the melt index is less than 0.50 g/10 min, there is a risk of deterioration in processability, and when it exceeds 0.70 g/10 min, there is a risk of deterioration in FNCT. In the present disclosure, as the copolymer has a melt index within the above range, processability can be remarkably improved without reducing FNCT. More specifically, the melt index ($MI_{2.16}$) of the ethylene/1-hexene copolymer may be 0.52 g/10 min or more, or 0.54 g/10 min or more, and 0.69 g/10 min or less, or 0.68 g/10 min or less.

In addition, the ethylene/1-hexene copolymer may have a high load melt index (HLMI, $MI_{21.6}$) of 20 g/10 min to 30 g/10 min, when measured at 190° C. under a load of 21.6 kg in accordance with ASTM D 1238. The high load melt index indicates processability. When the high load melt index is less than 20 g/10 min, there is a risk of a decrease in (processability) effect, and when it exceeds 30 g/10 min, there is a risk of a decrease in FNCT. In the present disclosure, as the copolymer has a high load melt index within the above range, an improvement effect can be exhibited in terms of processability without concern about deterioration in FNCT. More specifically, the high load melt index of the ethylene/1-hexene copolymer may be 20.5 g/10 min or more, or 21 g/10 min or more, and 29 g/10 min or less, or 28 g/10 min or less.

The ethylene/1-hexene copolymer may have a melt flow rate ratio ($MI_{21.6}/MI_{2.16}$) of 30 to 50, when measured at 190° C. in accordance with ASTM D 1238. As the copolymer has the melt flow rate ratio within the above range, flowability at each load is appropriately controlled, so that processability and mechanical properties can be improved at the same time. More preferably, the melt flow rate ratio may be 31 or more, or 32 or more, and 48 or less, or 46 or less.

In addition, the ethylene/1-hexene copolymer may have a shear viscosity ($\eta_{1000}$) of 420 pa·s to 460 pa·s, when measured using a capillary at 210° C. and a shear rate of 1/1000 second.

The shear rate is a shear rate applied during processing of the polymer, and may be adjusted according to the processing method. In addition, the temperature refers to a processing temperature of the polymer. For example, when the polymer is used for extrusion or injection, the temperature means a temperature applied to the extrusion or injection process. The temperature may be adjusted depending on the applied polymer, and in the present disclosure, the temperature for the ethylene/1-hexene copolymer may be 190 to 230° C., and more specifically, 210° C.

The shear viscosity measured under the above temperature and shear rate conditions during processing is related to processability during pipe extrusion. The lower the shear viscosity, the better the processability. However, when the shear viscosity is too low, there is a risk of a decrease in FNCT. In addition, when the shear viscosity is high, the processing load and torque during extrusion become high, so that RPM cannot be increased and the speed is decreased. In addition, excessively high shear viscosity causes melt fracture, resulting in reduced gloss and formation of protrusions on the appearance of pipe products. However, the ethylene/1-hexene copolymer according to an embodiment of the present disclosure has the shear viscosity within the above range by controlling the molecular weight with the controlled conditions of hydrogen input during production. As a result, excellent processability can be exhibited without concern about deterioration in FNCT effect. More specifically, it may exhibits the shear viscosity of 425 pa·s or more, 430 pa·s or more, or 440 pa·s or more, and 455 pa·s or less, 453 pa·s or less, or 450 pa·s or less. The viscosity of the ethylene/1-hexene copolymer may be within the above-described range in terms of improving flexibility and securing excellent pressure resistance during pipe processing. In particular, the ethylene/1-hexene copolymer of the present disclosure may have excellent characteristics such as extrusion pressure and torque due to low viscosity in the processing region.

For example, the shear viscosity of the ethylene/1-hexene copolymer may be measured using a capillary at 210° C. and a shear rate of 1/1000 second, and a specific measurement method will be described in more detail in Test Examples below.

In addition, the ethylene/1-hexene copolymer may have a characteristic stress (C.S.) of 10.0 MPa to 12.0 Mpa, specifically 10.5 MPa or more, or 11.0 MPa or more, and 11.9 MPa or less, or 11.7 MPa or less, when measured in accordance with ASTM D 638. The characteristic stress of the ethylene/1-hexene copolymer may be within the above-described range in terms of improving flexibility and securing excellent pressure resistance during pipe processing.

For example, the characteristic stress (C.S.) of the ethylene/1-hexene copolymer may be measured by a tensile test of stress-strain in accordance with ASTM D 638, and a specific measurement method will be described in more detail in Test Examples below.

In addition, the ethylene/1-hexene copolymer may have resistance to internal pressure of 8.3 MPa to 9.3 Mpa, specifically 8.5 MPa or more, or 8.9 MPa or more, and 9.28 MPa or less, or 9.24 MPa or less, when measured in accordance with ISO 9080. The resistance to internal pressure of the ethylene/1-hexene copolymer may be within the above-mentioned range in terms of improving flexibility and securing excellent pressure resistance during pipe processing.

In addition, the ethylene/1-hexene copolymer may have flexural modulus (F.M.) of 4500 kg/cm$^2$ to 4800 kg/cm$^2$, specifically 4600 kg/cm$^2$ or more, or 4650 kg/cm$^2$ or more, and 4780 kg/cm$^2$ or less, or 4750 kg/cm$^2$ or less, when measured in accordance with ASTM D 790. The flexural modulus of the ethylene/1-hexene copolymer may be within the above-mentioned range in terms of improving flexibility and securing excellent pressure resistance during pipe processing.

In addition, the 1-hexene content in the copolymer may be 5 wt % to 10 wt % based on a total weight of the copolymer. More specifically, the ethylene/1-hexene copolymer may have the content of 1-hexene comonomer of 5 wt % to 9.5 wt %, 5 wt % to 9 wt %, or 5 wt % to 7 wt % based on the total weight of the copolymer.

Meanwhile, the ethylene/1-hexene copolymer having the above-described physical properties may be prepared by a method including the step of copolymerizing ethylene and 1-hexene in a mono-modal polymerization process in the presence of a catalyst composition containing a first metallocene compound represented by the following Chemical Formula 1 and a second metallocene compound represented by the following Chemical Formula 2 while introducing hydrogen gas.

Accordingly, in another embodiment of the present disclosure, there is provided a method for preparing the ethylene/1-hexene copolymer:

$$(Cp^1R^a)_n(Cp^2R^b)M^1Z^1{}_{3-n}$$ [Chemical Formula 1]

in Chemical Formula 1, $M^1$ is a Group 4 transition metal;

each of $Cp^1$ and $Cp^2$ is cyclopentadienyl unsubstituted or substituted with $C_{1-20}$ hydrocarbyl;

$R^a$ and $R^b$ are the same as or different from each other, and are each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, $C_{2-20}$ alkynyl, or substituted or unsubstituted $C_{2-20}$ heteroaryl containing at least one heteroatom selected from the group consisting of N, O and S, provided that at least one of $R^a$ and $R^b$ is not hydrogen;

$Z^1$ are each independently halogen, $C_{1-20}$ alkyl, $C_{2-20}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy; and n is 1 or 0;

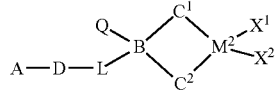

[Chemical Formula 2]

in Chemical Formula 2,

A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl;

D is —O—, —S—, —N(R)—, or —Si(R)(R')—, wherein R and R' are the same or different from each other, and are each independently hydrogen, halogen, $C_{1-20}$ alkyl, $C_{2-20}$ alkenyl, or $C_{6-20}$ aryl;

L is $C_{1-10}$ linear or branched alkylene;

B is carbon, silicon, or germanium;

Q is hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;

$M^2$ is a Group 4 transition metal;

$X^1$ and $X^2$ are the same as or different from each other, and are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate; and $C^1$ and $C^2$ are the same as or different from each other, and are each independently represented by one of Chemical Formula 2a, Chemical Formula 2b, or Chemical Formula 2c, except that both of $C^1$ and $C^2$ are represented by Chemical Formula 2c;

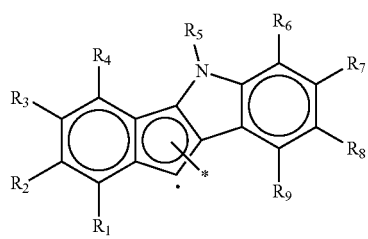

[Chemical Formula 2a]

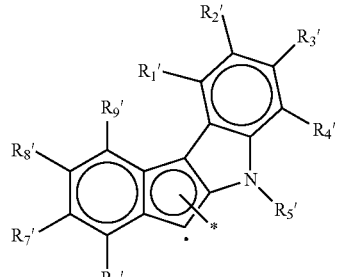

[Chemical Formula 2b]

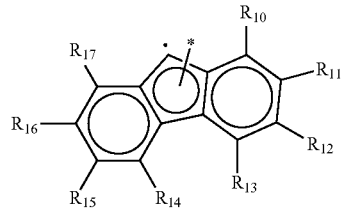

[Chemical Formula 2c]

in Chemical Formulae 2a, 2b, and 2c, $R_1$ to $R_{17}$ and $R_1'$ to $R_9'$ are the same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and two or more substituents adjacent to each other of $R_{10}$ to $R_{17}$ may be connected with each other to form a substituted or unsubstituted aliphatic or aromatic ring;

· represents a site of binding to B; and

* represents a site of binding to $M^2$.

Unless otherwise specified herein, following terms may be defined as follows.

The halogen may be fluorine (F), chlorine (Cl), bromine (Br) or iodine (I).

The $C_{1-30}$ alkyl group may be a linear, branched or cyclic alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group or the like.

The $C_{2-30}$ alkenyl group may be a linear, branched, or cyclic alkenyl group. Specifically, the $C_{2-30}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, or the like.

The $C_{6-30}$ aryl may be a monocyclic, bicyclic or tricyclic aromatic hydrocarbon, and includes monocyclic or condensed aryl. Specifically, the $C_{6-30}$ aryl may be phenyl, biphenyl, naphthyl, anthracenyl, phenanthrenyl, fluorenyl, or the like.

The $C_{7-40}$ alkylaryl may be a substituent in which at least one hydrogen of the aryl is substituted with alkyl. Specifically, the $C_{7-40}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-40}$ arylalkyl may include a substituent in which at least one hydrogen of the alkyl is substituted with aryl. Specifically, the $C_{7-40}$ arylalkyl may be benzyl, phenylpropyl, phenylhexyl, or the like.

The $C_{6-10}$ aryloxy may be phenoxy, biphenoxy, and naphthoxy, or the like, but the present disclosure is not limited thereto.

The $C_{1-20}$ alkoxy group may be a methoxy group, an ethoxy group, a phenyloxy group, a cyclohexyloxy group, or the like, but the present disclosure is not limited thereto.

The $C_{2-20}$ alkoxyalkyl group is a functional group in which at least one hydrogen of the alkyl group is substituted with an alkoxy group, and specifically, it may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, or the like, but the present disclosure is not limited thereto.

The $C_{1-20}$ alkylsilyl group or the $C_{1-20}$ alkoxysilyl group is a functional group in which 1 to 3 hydrogens of —SiH$_3$ are substituted with 1 to 3 alkyl groups or alkoxy groups described above, and specifically, it may be an alkylsilyl group such as a methylsilyl group, a dimethylsilyl group, a trimethylsilyl group, a dimethylethylsilyl group, a diethylmethylsilyl group or a dimethylpropylsilyl group; an alkoxysilyl group such as a methoxysilyl group, a dimethoxysilyl group, a trimethoxysilyl group or a dimethoxyethoxysilyl group; or an alkoxyalkylsilyl group such as a methoxydimethylsilyl group, a diethoxymethylsilyl group or a dimethoxypropylsilyl group, but the present disclosure is not limited thereto.

The $C_{1-20}$ silylalkyl group is a functional group in which at least one hydrogen of the alkyl group is substituted with a silyl group, and specifically, it may be —CH$_2$—SiH$_3$, a methylsilylmethyl group or a dimethylethoxysilylpropyl group, or the like, but the present disclosure is not limited thereto.

The sulfonate group has a structure of —O—SO$_2$—R', wherein R' may be a $C_{1-20}$ alkyl group. Specifically, the $C_{1-20}$ sulfonate group may be a methanesulfonate group, a phenylsulfonate group, or the like, but the present disclosure is not limited thereto.

The heteroaryl is a $C_{2-20}$ heteroaryl containing at least one of N, O, and S as a heterogeneous element, and includes monocyclic or condensed heteroaryl. Specifically, it may be xanthene, thioxanthen, a thiophene group, a furan group, a pyrrole group, an imidazole group, a thiazole group, an oxazole group, an oxadiazole group, a triazole group, a pyridyl group, a bipyridyl group, a pyrimidyl group, a triazine group, an acridyl group, a pyridazine group, a pyrazinyl group, a quinolinyl group, a quinazoline group, a quinoxalinyl group, a phthalazinyl group, a pyrido-pyrimidinyl group, a pyrido-pyrazinyl group, a pyrazino-pyrazinyl group, an isoquinoline group, an indole group, a carbazole group, a benzoxazole group, a benzoimidazole group, a benzothiazole group, a benzocarbazole group, a benzothiophene group, a dibenzothiophene group, a benzofuranyl group, a phenanthroline group, an isoxazolyl group, a thiadiazolyl group, a phenothiazinyl group, a dibenzofuranyl group, or the like, but the present disclosure is not limited thereto.

In addition, the Group 4 transition metal may be titanium (Ti), zirconium (Zr), hafnium (Hf), or rutherfordium (Rf), and specifically titanium (Ti), zirconium (Zr), or hafnium (Hf). More specifically, it may be zirconium (Zr) or hafnium (Hf), but is not limited thereto.

In addition, the group 13 element may be boron (B), aluminum (Al), gallium (Ga), indium (In), or thallium (Tl), and specifically, boron (B), or aluminum (Al). But it is not limited thereto.

The above-mentioned substituents may be optionally substituted with one or more substituents selected from the group consisting of a hydroxyl group; halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group within the range of exhibiting the same or similar effects as the desired effects.

In addition, "two neighboring substituents are connected with each other to form an aliphatic or aromatic ring" means that the atom(s) of two substituents and the atom(s) to which the two substituents are bonded are connected with each other to form a ring. Specifically, examples in which $R_9$ and $R_{10}$ of —NR$_9$R$_{10}$ are connected with each other to form an aliphatic ring include a piperidinyl group, and examples in which $R_9$ and $R_{10}$ of —NR$_9$R$_{10}$ are connected with each other to form an aromatic ring include a pyrrolyl group.

In the catalyst composition, the first metallocene compound represented by the Chemical Formula 1 is a non-crosslinked compound including ligands of Cp$^1$ and Cp$^2$, and is advantageous for mainly producing a low molecular weight copolymer having a low SCB (short chain branch) content.

Specifically, in the Chemical Formula 1, the ligands of Cp$^1$ and Cp$^2$ may be the same or different from each other, and each may be cyclopentadienyl and substituted with one or more, or one to three $C_{1-10}$ alkyls. As the ligands of Cp$^1$ and Cp$^2$ have a pair of non-covalent electrons capable of acting as a Lewis base, high polymerization activity may be achieved. Particularly, as the ligands of Cp$^1$ and Cp$^2$ are cyclopentadienyl with relatively little steric hindrance, they exhibit high polymerization activity and low hydrogen reactivity, and thus low molecular weight olefin polymers can be polymerized with high activity.

In addition, the ligands of Cp$^1$ and Cp$^2$ can easily control properties such as chemical structure, molecular weight, molecular weight distribution, mechanical properties, and transparency of the olefin polymer to be prepared by adjusting the degree of steric hindrance effect depending on the type of the substituted functional groups. Specifically, the ligands of Cp$^1$ and Cp$^2$ are substituted with R$^a$ and R$^b$, respectively, wherein R$^a$ and R$^b$ are the same as or different from each other, and each may independently be hydrogen, $C_{1-20}$ alkyl, $C_{2-20}$ alkoxyalkyl, $C_{7-40}$ arylalkyl, or substituted or unsubstituted $C_{2-12}$ heteroaryl containing at least one heteroatom selected from the group consisting of N, O and S, and more specifically $C_{1-10}$ alkyl, $C_{2-10}$ alkoxyalkyl, $C_{7-20}$ arylalkyl, or substituted or unsubstituted $C_{4-12}$ heteroaryl containing at least one heteroatom selected from the group consisting of N, O and S.

$M^1Z^1_{3-n}$ presents between the ligands of Cp$^1$ and Cp$^2$, and $M^1Z^1_{3-n}$ may affect storage stability of metal complex. In order to effectively ensure this effect, $Z^1$ may each independently be halogen or $C_{1-20}$ alkyl, and more specifically F, Cl, Br or I. Further, $M^1$ may each independently be Ti, Zr or Hf; Zr or Hf; or Zr.

The first transition metal compound may be a compound in which each of Cp$^1$ and Cp$^2$ is an unsubstituted or substituted cyclopentadienyl group, and R$^a$ and R$^b$ are each independently hydrogen, $C_{1-10}$ alkyl, $C_{2-10}$ alkoxyalkyl, or $C_{7-20}$ arylalkyl, wherein at least one of $R^a$ and $R^b$ is an alkoxyalkyl group such as t-butoxyhexyl group, more specifically, a substituent of —$(CH_2)_p$—$OR^c$ (wherein $R^c$ is a linear or branched alkyl group having 1 to 6 carbon atoms, and p is an integer of 2 to 4). And, this case shows a low conversion to the comonomer compared to other Cp-based catalysts not including the above substituent in the preparation of a polyolefin using the comonomer, so that a low molecular weight polyolefin in which the degree of copolymerization or comonomer distribution is controlled can be prepared. In addition, when the first transition metal compound having the above structure is supported on a support, the —$(CH_2)_p$—$OR^c$ group among the substituents can form a covalent bond through close interaction with the silanol group on the surface of the silica used as the support. Therefore, stable supported polymerization is possible.

The first metallocene compound represented by the Chemical Formula 1 may be a compound represented by one of the following structural formulae, but is not limited thereto:

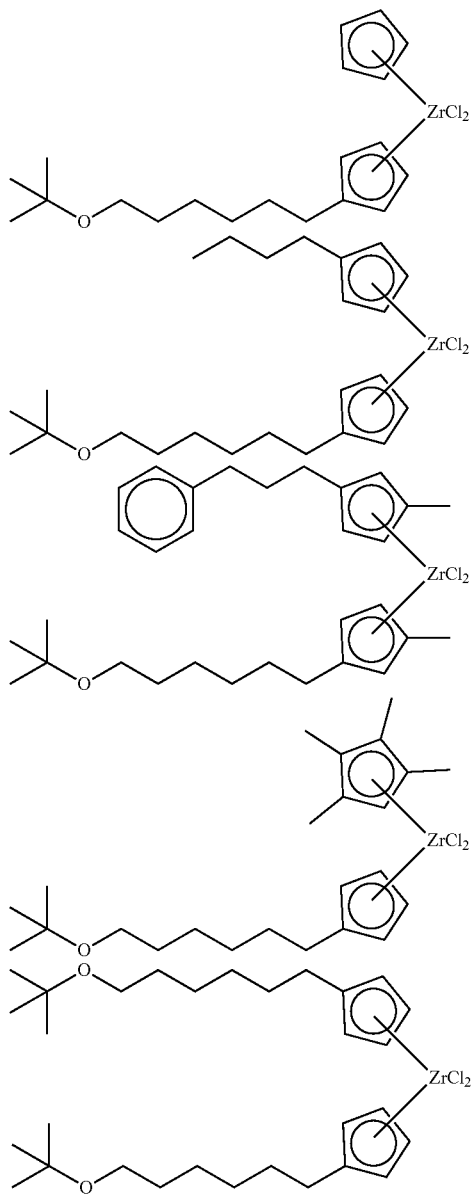

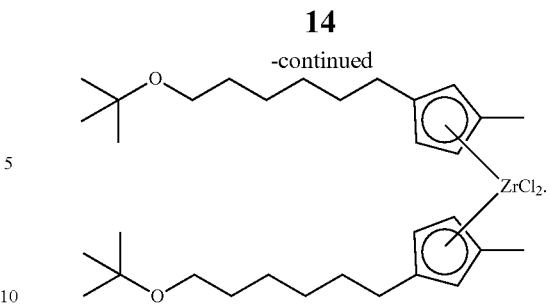

The first metallocene compound represented by the Chemical Formula 1 may be synthesized by applying known reactions, and a more detailed synthesis method may be understood with reference to Examples.

The method for preparing the polyethylene according to the present disclosure is a mono-modal polymerization process, wherein at least one first metallocene compound represented by the Chemical Formula 1 is used with at least one second metallocene compound to be described later. By using them, it is possible to control the ratio of the high molecular polymer and the low molecular polymer in the molecule of the ethylene/1-hexene copolymer, and improve flexibility and processability when applied to high-pressure heating pipes, PE-RT pipes, or large-diameter pipes.

Meanwhile, in the second metallocene compound, L of Chemical Formula 2 is preferably $C_{4-8}$ linear or branched alkylene, but is not limited thereto. In addition, the alkylene group may be unsubstituted or substituted with $C_{1-20}$ alkyl, $C_{2-20}$ alkenyl, or $C_{6-20}$ aryl.

In addition, A of Chemical Formula 2 is preferably hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl, but is not limited thereto.

In addition, B of Chemical Formula 2 is preferably silicon, but is not limited thereto.

The second metallocene compound of Chemical Formula 2 has a structure in which an indeno indole derivative and/or a fluorene derivative is cross-linked by a bridge, and has a non-covalent electron pair capable of acting as a Lewis base in a ligand structure, thereby exhibiting high polymerization activity. In addition, the inclusion of the electronically enriched indeno indole derivative and/or fluorene derivative can enable high activity, and low hydrogen reactivity due to appropriate steric hindrance and electronic effect of the ligand. Further, high activity is maintained even in the presence of hydrogen. In addition, the indeno indole derivative can stabilize beta-hydrogen of the polymer chain in which nitrogen atoms grow by hydrogen bonding to inhibit beta-hydrogen elimination, thereby preparing an ethylene/1-hexene copolymer having an ultra-high molecular weight.

According to an embodiment of the present disclosure, specific examples of the substituent represented by the Chemical Formula 2a may include those represented by one of the following structural formulae, but the present invention is not limited thereto.

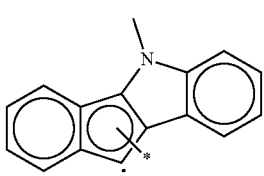

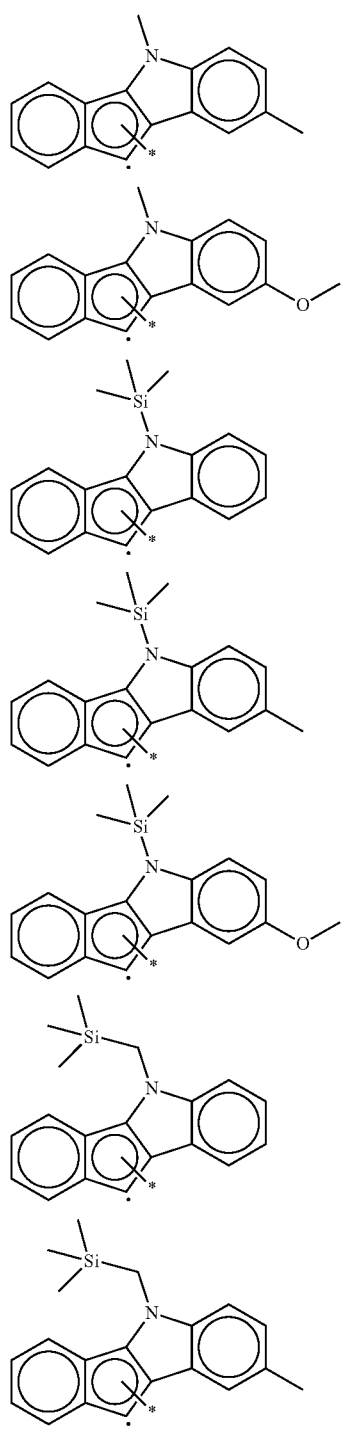
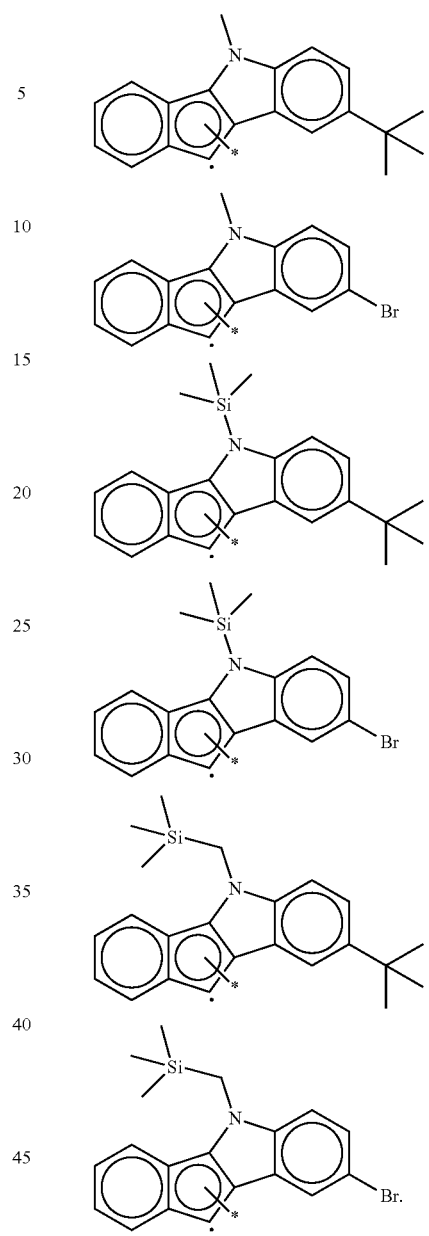
According to an embodiment of the present disclosure, specific examples of the substituent represented by the Chemical Formula 2b may include those represented by one of the following structural formulae, but the present invention is not limited thereto.
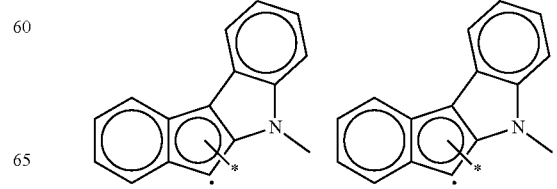

-continued

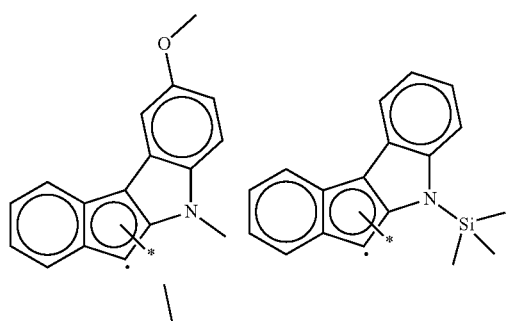
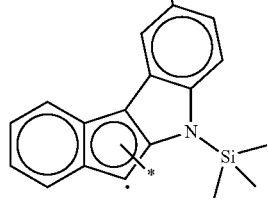
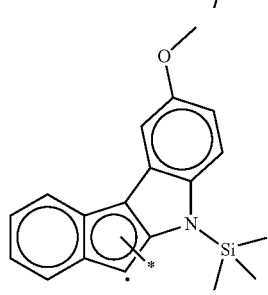
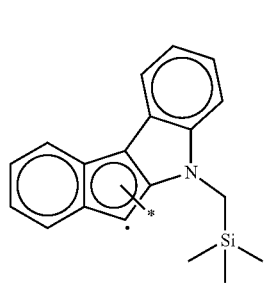
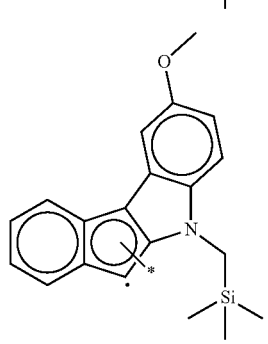

-continued

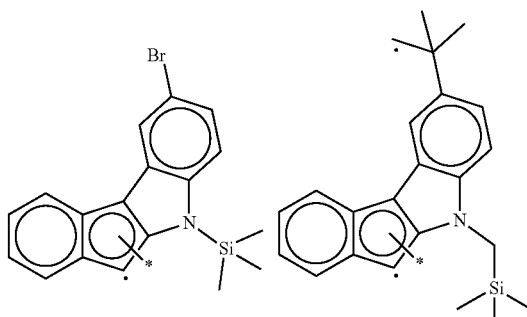
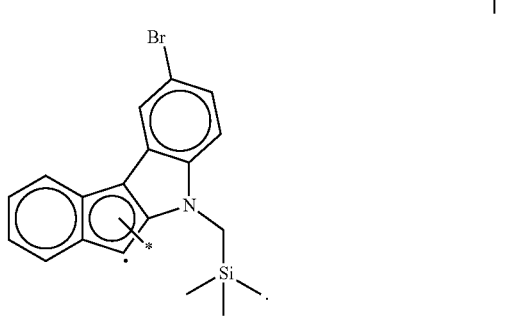

According to an embodiment of the present disclosure, specific examples of the substituent represented by the Chemical Formula 2c may include those represented by one of the following structural formulae, but the present invention is not limited thereto.

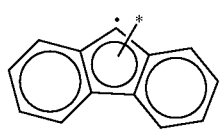
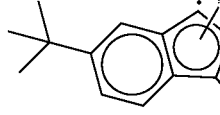

The second metallocene compound represented by the Chemical Formula 2 may be a compound represented by one of the following structural formulae, but is not limited thereto:

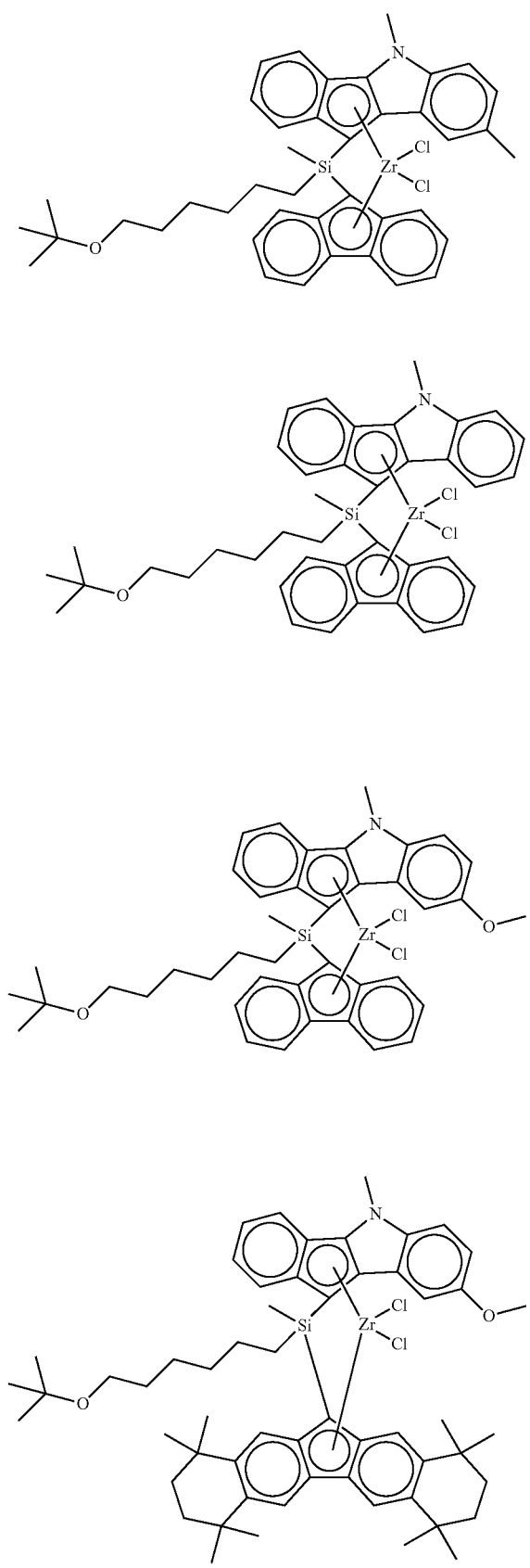
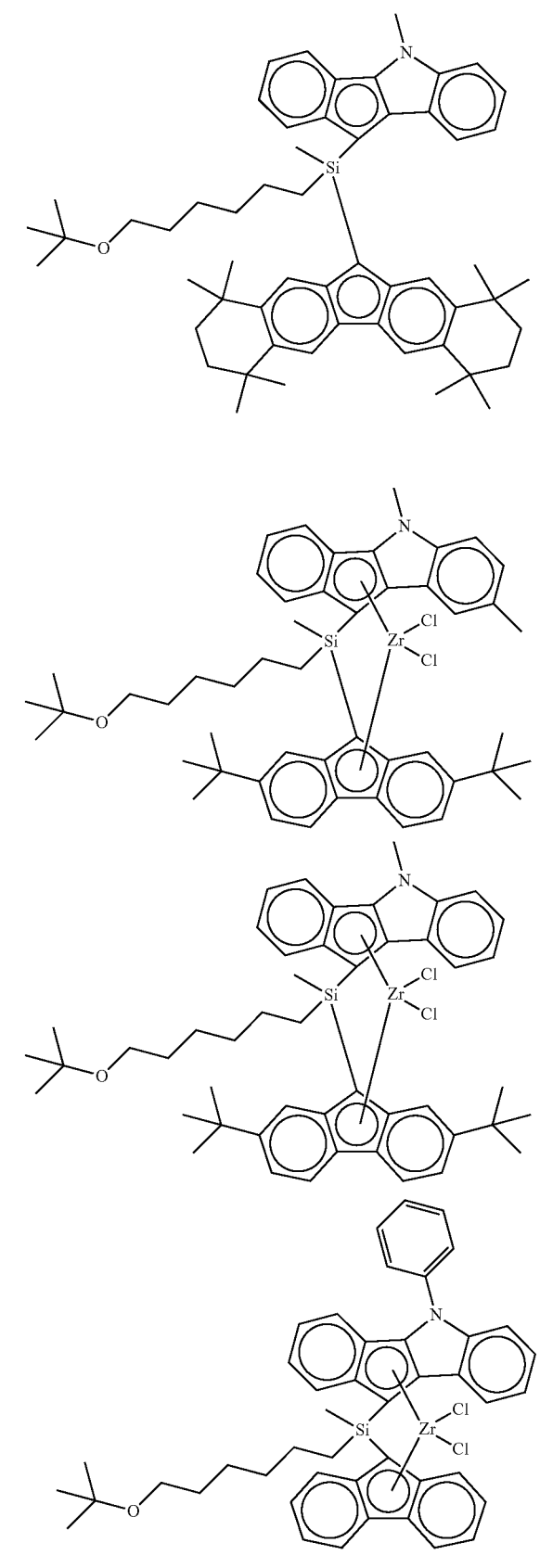

-continued
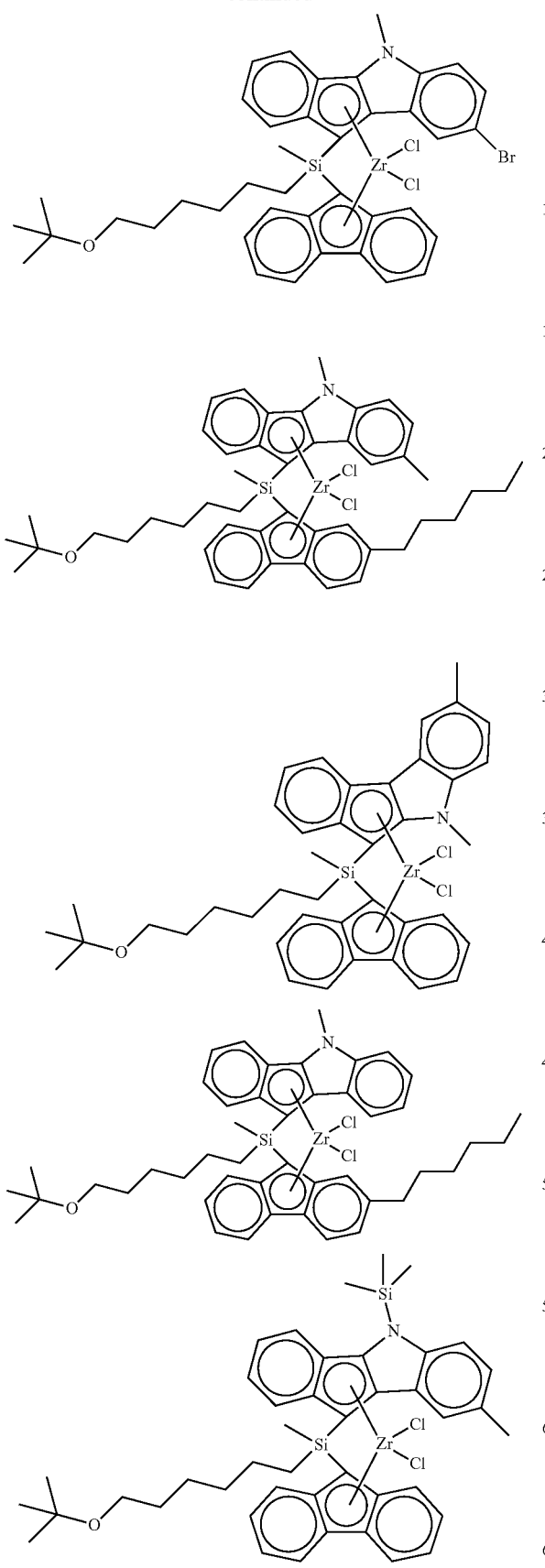
-continued
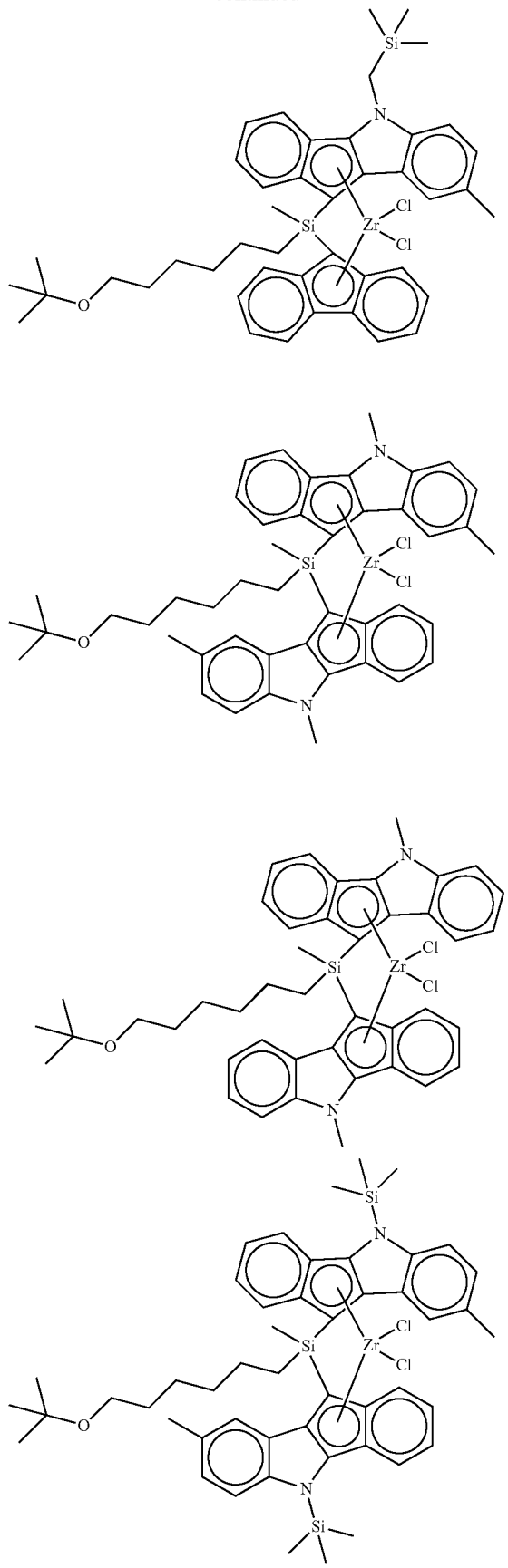

-continued

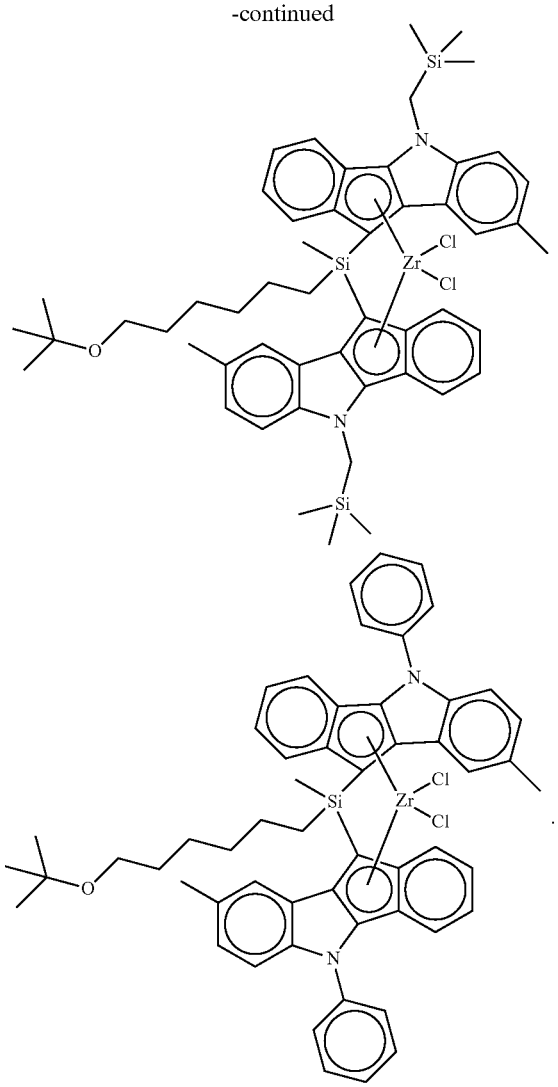

The second metallocene compound represented by the Chemical Formula 2 may be synthesized by applying known reactions, and a more detailed synthesis method may be understood with reference to Examples.

The second metallocene compound of Chemical Formula 2 has excellent activity and can polymerize a high molecular weight ethylene/1-hexene copolymer. In particular, even when used by being supported on a support, it exhibits high polymerization activity, so that an ethylene/1-hexene copolymer having an ultra-high molecular weight can be prepared.

In addition, even when a polymerization reaction is performed with hydrogen to prepare an ethylene/1-hexene copolymer having a high molecular weight and a wide molecular weight distribution at the same time, the second metallocene compound of Chemical Formula 2 according to the present disclosure exhibits low hydrogen reactivity, so that it is possible to copolymerize an ethylene/1-hexene having an ultra-high molecular weight with high activity. Therefore, even when used in combination with a catalyst having other characteristics, an ethylene/1-hexene copolymer satisfying the characteristics of high molecular weight can be prepared without deterioration in activity, and thus an ethylene/1-hexene copolymer having a wide molecular weight distribution while including a high molecular weight ethylene/1-hexene copolymer can be easily prepared.

The second metallocene compound of Chemical Formula 2 may be obtained by connecting an indeno indole derivative and/or a fluorene derivative with a bridge compound to prepare a ligand compound, and then adding a metal precursor compound to perform metallation. The method for preparing the second metallocene compound will be described in detail in Examples to be described later.

As described above, in the catalyst composition, the first metallocene compound represented by the Chemical Formula 1 may mainly contribute to making a low molecular weight copolymer having a low SCB content, and the second metallocene compound represented by the Chemical Formula 2 may mainly contribute to making a high molecular weight copolymer having a high SCB content. More specifically, the catalyst composition exhibits high comonomer incorporation with respect to 1-hexene in the high molecular weight region of the copolymer by the second metallocene compound, and low comonomer incorporation with respect to 1-hexene in the low molecular weight region of the copolymer by the first metallocene compound. As a result, it is possible to prepare an olefin polymer having a BOCD (Broad Orthogonal Co-monomer Distribution) structure in which 1-hexene comonomers are incorporated predominantly in high-molecular-weight main chains, that is, a structure in which the SCB content increases as the molecular weight increases while having a wide molecular weight distribution, thereby exhibiting excellent physical properties with excellent processability.

In addition, controlling the content ratio of the first and second metallocene compounds in the catalyst composition may facilitate securing the above-described physical properties and further enhance the improvement effect. Accordingly, it is preferable that the second metallocene compound is included in a higher content than the first metallocene compound in the catalyst composition of the present disclosure, and specifically, the first and second metallocene compounds are included in a molar ratio of 1:2 to 1:5.

Meanwhile, the catalyst composition may further include a support, and the first and second metallocene compounds are used in a state supported on the support. When used as a supported catalyst, the polymer to be prepared has excellent particle shape and bulk density, and the catalyst can be suitably used in conventional slurry polymerization, bulk polymerization, and gas phase polymerization.

The support may be silica, alumina, magnesia, silica-alumina, or silica-magnesia, and it may usually contain oxides, carbonates, sulfates, or nitrates such as $Na_2O$, $K_2CO_3$, $BaSO_4$, $Mg(NO_3)_2$ and the like. Among the above-mentioned supports, the silica support has little catalyst released from the surface of the support in the polymerization process of propylene, because the transition metal compound is supported by chemical bonding with a reactive functional group such as a siloxane group present on the surface of the silica support. As a result, when the polypropylene is prepared by slurry polymerization or gas phase polymerization, a fouling phenomenon, sticking to the wall surface of the reactor or with each other, may be minimized.

In addition, the support may be surface-modified by a calcination or drying process in order to increase supporting efficiency and minimize leaching and fouling. Through the surface modification step as described above, moisture on the surface of the support that inhibits the reaction with the supported component may be removed, and the content of reactive functional groups capable of chemical bonding with the supported components, for example, a hydroxyl group and a siloxane group, may be increased.

Specifically, the calcination or drying process of the support may be performed in a range from a temperature at which moisture disappears from the surface of the support to a temperature at which reactive functional groups, particularly hydroxyl groups (OH groups) present on the surface, are completely eliminated. Specifically, the temperature may be 150 to 600° C., or 200 to 600° C. When the temperature is low, less than 150° C., the moisture removal efficiency is low, and as a result, the moisture remaining on the support may react with the cocatalyst to lower the supporting efficiency. When the temperature is excessibily high, higher than 600° C., pores on the surface of the support may be combined with each other to reduce specific surface area, and many reactive functional groups such as hydroxyl groups or silanol groups may be lost from the surface, leaving only siloxane groups. Thus, reactive sites with cocatalyst may be reduced, which is not preferable.

When the first and second metallocene compounds are supported on a support and the support is silica, the first and second metallocene compounds may be supported in a total amount of 40 μmol or more, or 80 μmol or more, and 240 μmol or less, or 160 μmol or less based on 1 g of silica. When supported within the above range, it may exhibit an appropriate supporting activity, which may be advantageous in terms of maintaining the activity of the catalyst and economic feasibility.

In addition, the catalyst composition may further include a cocatalyst in terms of improving high activity and process stability.

The cocatalyst may include at least one selected from the group consisting of compounds represented by the following Chemical Formulae 3 to 5.

$$—[Al(R_{31})—O]_m—$$ [Chemical Formula 3]

in Chemical Formula 3, $R_{31}$ are the same as or different from each other, and are each independently halogen; $C_{1-20}$ hydrocarbon; or $C_{1-20}$ halogen-substituted hydrocarbon; and m is an integer of 2 or more;

$$J(R_{41})_3$$ [Chemical Formula 4]

in Chemical Formula 4, $R_{41}$ are the same as or different from each other, and are each independently halogen; $C_{1-20}$ hydrocarbon; or $C_{1-20}$ halogen-substituted hydrocarbon; and J is aluminum or boron;

$$[E-H]^+[ZD_4]^- \text{ or } [E]^+[ZD_4]^-$$ [Chemical Formula 5]

in Chemical Formula 5,

E is a neutral or cationic Lewis base;

H is a hydrogen atom;

$[L-H]^+$ is a Brønsted acid;

Z is a Group 13 element; and

D are the same as or different from each other, and are each independently $C_{6-20}$ aryl or $C_{1-20}$ alkyl, wherein the $C_{6-20}$ aryl or $C_{1-20}$ alkyl is unsubstituted or substituted with at least one substituent selected from the group consisting of halogen, $C_{1-20}$ alkyl, $C_{1-20}$ alkoxy and $C_{6-20}$ aryloxy.

Examples of the compound represented by the Chemical Formula 3 may include an alkylaluminoxane-based compound such as methylaluminoxane, ethylaluminoxane, isobutylaluminoxane, butylaluminoxane, and the like, and any one or a mixture thereof may be used.

Examples of the compound represented by the Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and any one or a mixture thereof may be used.

Examples of the compound represented by the Chemical Formula 5 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N, N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N, N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

Among the compounds described above, the cocatalyst may be, more specifically, an alkylaluminoxane-based cocatalyst such as methylaluminoxane.

The alkylaluminoxane-based cocatalyst stabilizes the metallocene compounds and acts as a Lewis acid, so that further enhances catalytic activity by including a metal element capable of forming a bond with a functional group introduced into a bridge group of the second metallocene compound through Lewis acid-base interaction.

In addition, the amount of the cocatalyst used may be appropriately adjusted depending on desired properties or effects of the catalyst and the resin composition. For example, when silica is used as the support, the cocatalyst may be supported in an amount of 8 mmol or more, or 10 mmol or more, and 25 mmol or less, or 20 mmol or less based on a weight of the support, for example, 1 g of silica.

The catalyst composition having the above configuration may be prepared by a method including the steps of: supporting a cocatalyst compound on a support; and supporting the transition metal compound represented by the Chemical Formula 1 on the support. Herein, the supporting order of the cocatalyst and the transition metal compound represented by the Chemical Formula 1 may be changed, if necessary. In consideration of the effect of the supported catalyst having a structure determined according to the supporting order, supporting the transition metal compound after supporting the cocatalyst on the support can achieve higher catalytic activity and better process stability in the preparation of a polypropylene.

In addition, the catalyst composition described above may be used by itself for polymerization, or may be used in a prepolymerized state by contacting with propylene monomers before the use in a polymerization reaction. In this case, the preparation method according to an embodiment of the present disclosure may further include a prepolymerization step of contacting the catalyst composition with propylene monomers before preparing a homopolypropylene by a polymerization reaction.

In addition, the catalyst composition may be dissolved or diluted in an aliphatic hydrocarbon solvent having 5 to 12 carbon atoms such as pentane, hexane, heptane, nonane, decane, and an isomer thereof, an aromatic hydrocarbon solvent such as toluene, and benzene, or a hydrocarbon solvent substituted with chlorine such as dichloromethane, and chlorobenzene, and then injected. The solvent used herein is preferably used after removing a small amount of water or air, which acts as a catalyst poison, by treating with a small amount of alkyl aluminum. It is also possible to further use the cocatalyst.

Meanwhile, the polymerization process may be performed by contacting ethylene and 1-hexene in the presence of the above-described catalyst composition.

In particular, the polymerization reaction is characterized in that it is performed in a mono-modal polymerization process. Herein, the mono-modal polymerization process means performing the copolymerization process in a single polymerization reactor, and may preferably be performed in one loop-type slurry reactor.

In general, the conventional multi-modal polymerization reaction uses two or more reactors depending on the number of catalysts, and each catalyst is added to each of the two or more reactors to perform the polymerization reaction. In this reaction, polymers having different molecular weights are prepared, and then mixed. However, this case has a problem in that uniformity is lowered due to the different molecular weights. In contrast, since the present disclosure performs a mono-modal polymerization reaction in a single reactor by hybrid supporting two types of catalysts on a single support, a low molecule weight polymer and a high molecular polymer are simultaneously polymerized, and as a result, a polymer with excellent uniformity can be prepared.

The polymerization may be performed at a temperature of 25° C. to 500° C., preferably 25° C. to 200° C., and more preferably 50° C. to 150° C. In addition, the polymerization may be performed at a pressure of 1 kgf/cm$^2$ to 100 kgf/cm$^2$, preferably 1 kgf/cm$^2$ to 50 kgf/cm$^2$, and more preferably 5 kgf/cm$^2$ to 30 kgf/cm$^2$.

In addition, in the copolymerization process, the input of 1-hexene as a comonomer may be about 5 wt % to about 15 wt % based on the total input weight of ethylene. More specifically, the input of the 1-hexene comonomer is about 5 wt % to about 10 wt %, about 5 wt % to about 9.5 wt %, about 5 wt % to about 9 wt %, about 5.1 wt % to about 8.8 wt %, about 5.2 wt % to about 8.5 wt %, or 5.2 wt % to about 8.2 wt %.

Meanwhile, the ethylene/1-hexene copolymer according to the present disclosure may be prepared by copolymerizing ethylene and 1-hexene in the monomodal polymerization process described above in the presence of the above-described catalyst composition while introducing hydrogen gas.

For example, the hydrogen gas may be introduced in an amount of 35 ppm to 250 ppm, 40 ppm to 200 ppm, 50 ppm to 190 ppm, 55 ppm to 180 ppm, 58 ppm to 170 ppm, or 60 ppm to 145 ppm based on the weight of ethylene. The above hydrogen gas content maintains the chain propagation and chain transfer rate almost constant, and optimizes the content of the high molecular region and the low molecular region of the polymer with a wide molecular weight distribution. Thus, the hydrogen gas content may be within the above-mentioned range in terms of improving flexibility and securing excellent pressure resistance during pipe processing.

The ethylene/1-hexene copolymer prepared by the above-described preparation method may exhibit excellent FNCT due to a wide molecular weight distribution and excellent processability due to a high SCB content in a high molecular weight region. Due to the satisfaction of the above physical properties, the ethylene/1-hexene copolymer according to the present disclosure has good processability and extrusion properties, and exhibits excellent FNCT, so it may be preferably applied to high-pressure heating pipes, PE-RT pipes or large-diameter pipes, etc.

Meanwhile, there is provided a pipe including the above-described ethylene/1-hexene copolymer.

Hereinafter, the function and effect of the present invention will be described in more detail through specific examples. However, these examples are for illustrative purposes only, and the invention is not intended to be limited by these examples.

EXAMPLES

Preparation of Catalyst Precursor

Synthesis Example 1: Preparation of First Metallocene Compound (1)

t-butyl-O—(CH$_2$)$_6$—Cl was prepared by the method shown in Tetrahedron Lett. 2951 (1988) using 6-chlorohexanol, and reacted with cyclopentadienyl sodium (NaCp) to obtain t-butyl-O—(CH$_2$)$_6$—C$_5$H$_5$ (yield 60%, b.p. 80° C./0.1 mmHg).

In addition, t-butyl-O—(CH$_2$)$_6$—C$_5$H$_5$ was dissolved in tetrahydrofuran (THF) at −78° C., and normal butyllithium (n-BuLi) was slowly added thereto. Thereafter, it was heated to room temperature and reacted for 8 hours. The lithium salt solution synthesized as described above was slowly added to a suspension solution of ZrCl$_4$(THF)$_2$ (1.70 g, 4.50 mmol)/THF (30 mL) at −78° C., and further reacted for about 6 hours at room temperature. All volatiles were dried under vacuum and the resulting oily liquid material was filtered by adding a hexane solvent. The filtered solution was dried under vacuum, and hexane was added to obtain a precipitate at a low temperature (−20° C.). The obtained precipitate was filtered at a low temperature to obtain [t-Bu-O—(CH$_2$)$_6$—C$_5$H$_4$]$_2$ZrCl$_2$ compound (1) in the form of a white solid (yield 92%).

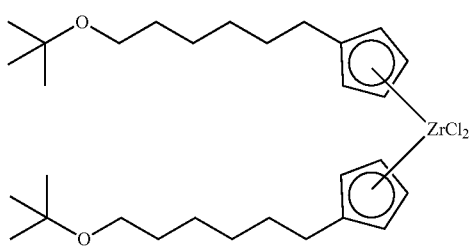

(1)

¹H NMR (300 MHz, CDCl₃): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).
¹³C NMR (CDCl₃): 135.09, 116.66, 112.28, 72.42, 61.52, 30.66, 30.61, 30.14, 29.18, 27.58, 26.00.

Synthesis Example 2: Preparation of Second Transition Metal Compound (2)

2-1) Preparation of Ligand Compound 2 g of fluorene was dissolved in 5 mL of MTBE (methyl tertiary butyl ether) and 100 mL of hexane, and 5.5 mL of a 2.5 M n-BuLi hexane solution was added dropwise in a dry ice/acetone bath, followed by stirring at room temperature overnight. 3.6 g of (6-(tert-butoxy)hexyl)dichloro(methyl) silane was dissolved in 50 mL of hexane, and the fluorene-Li slurry was transferred in a dry ice/acetone bath for 30 minutes, followed by stirring at room temperature overnight. At the same time, 5,8-dimethyl-5,10-dihydroindeno[1,2-b] indole (12 mmol, 2.8 g) was dissolved in 60 mL of THF and 5.5 mL of 2.5M n-BuLi hexane solution added dropwise in a dry ice/acetone bath, followed by stirring at room temperature overnight. After confirming the completion of the reaction by NMR sampling of the reaction solution of fluorene and (6-(tert-butoxy)hexyl)dichloro(methyl)silane, 5,8-dimethyl-5,10-dihydroindeno[1,2-b]indole-Li solution was transferred in a dry ice/acetone bath. Then, it was stirred at room temperature overnight. After the reaction, it was extracted with ether/water and residual moisture of the organic layer was removed with MgSO₄ to obtain a ligand compound (Mw 597.90, 12 mmol). Thereafter, it was confirmed that two isomers were generated by ¹H-NMR.

¹H NMR (500 MHz, d⁶-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m).

2-2) Preparation of Metallocene Compound 7.2 g (12 mmol) of the ligand compound synthesized in 2-1 was dissolved in 50 mL of diethylether, and 11.5 mL of a 2.5 M n-BuLi hexane solution was added dropwise in a dry ice/acetone bath, followed by stirring at room temperature overnight. This was vacuum dried to obtain a brown sticky oil. It was dissolved in toluene to obtain a slurry. ZrCl₄ (THF)₂ was prepared, and 50 mL of toluene was added thereto to prepare a slurry. The 50 mL toluene slurry of ZrCl₄(THF)₂ was transferred in a dry ice/acetone bath. As the slurry was stirred at room temperature overnight, the color changed to violet color. The reaction solution was filtered to remove LiCl. Toluene of the filtrate was removed by vacuum drying, and then hexane was added thereto, followed by sonication for 1 hour. The slurry was filtered to obtain 6 g (Mw 758.02, 7.92 mmol, yield 66 mol %) of a dark violet metallocene compound as a filtered solid. Two isomers were observed on ¹H-NMR.

¹H NMR (500 MHz, CDCl₃): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m).

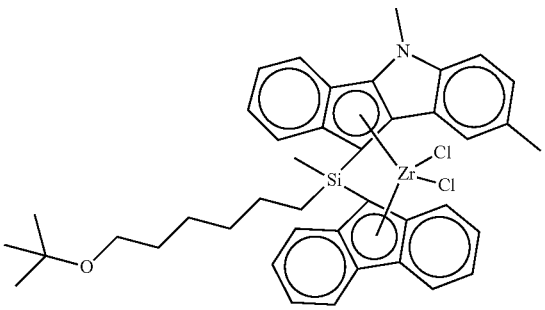

(2)

Synthesis Example 3: Preparation of Third Transition Metal Compound (3)

3-1) Preparation of Ligand Compound 50 g of Mg (s) was added to a 10 L reactor at room temperature, followed by 300 mL of THF. 0.5 g of I₂ was added, and the reactor temperature was maintained at 50° C. After the reactor temperature was stabilized, 250 g of 6-t-butoxyhexyl chloride was added to the reactor at a rate of 5 mL/min using a feeding pump. It was observed that the reactor temperature rose by 4° C. to 5° C. with the addition of 6-t-butoxyhexylchloride. It was stirred for 12 hours while continuously adding 6-t-butoxyhexylchloride. After reaction for 12 hours, a black reaction solution was obtained. 2 mL of the black solution was taken, and water was added thereto to obtain an organic layer. The organic layer was confirmed to be 6-t-butoxyhexane through ¹H-NMR. From this, it was confirmed that Grignard reaction was well performed. Thus, 6-t-butoxyhexyl magnesium chloride was synthesized.

500 g of methylsilyltrichloride (MeSiCl₃) and 1 L of THF were introduced to a reactor, and then the reactor temperature was cooled down to −20° C. 560 g of the 6-t-butoxyhexyl magnesium chloride synthesized above was added to the reactor at a rate of 5 mL/min using a feeding pump. After completion of the feeding of Grignard reagent, the mixture was stirred for 12 hours while slowly raising the reactor temperature to room temperature. After reaction for 12 hours, it was confirmed that white MgCl₂ salt was produced. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be methyl(6-t-butoxy hexyl)dichlorosilane through ¹H-NMR.

¹H-NMR (CDCl₃): 3.3 (t, 2H), 1.5 (m, 3H), 1.3 (m, 5H), 1.2 (s, 9H), 1.1 (m, 2H), 0.7 (s, 3H).

1.2 mol (150 g) of tetramethylcyclopentadiene and 2.4 L of THF were added to the reactor, and then the reactor temperature was cooled down to −20° C. 480 mL of n-BuLi was added to the reactor at a rate of 5 ml/min using a feeding pump. After n-BuLi was added, the mixture was stirred for 12 hours while slowly raising the reactor temperature to room temperature. After reaction for 12 hours, an equivalent of methyl(6-t-butoxy hexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of t-BuNH$_2$ was added. The mixture was stirred for 12 hours while slowly raising the reactor temperature to room temperature. After reaction for 12 hours, THF was removed. Thereafter, 4 L of hexane was added and the salt was removed through a labdori to obtain a filtered solution. The filtered solution was added to the reactor again, and hexane was removed at 70° C. to obtain a yellow solution. The yellow solution obtained above was confirmed to be methyl(6-t-butoxyhexyl)(tetramethylCpH) t-butylaminosilane through $^1$H-NMR.

3-2) Preparation of Metallocene Compound

TiCl$_3$(THF)$_3$ (10 mmol) was rapidly added to a dilithium salt of a ligand at −78° C., which was synthesized from n-BuLi and the ligand compound of methyl(6-t-butoxy-hexyl)(tetramethylCpH)t-butylaminosilane synthesized in 3-1 in THE solution. While slowly heating the reaction solution from −78° C. to room temperature, it was stirred for 12 hours. After stirring for 12 hours, an equivalent of PbCl$_2$ (10 mmol) was added to the reaction solution at room temperature, and then stirred for 12 hours. After stirring for 12 hours, a dark black solution having a blue color was obtained. THF was removed from the resulting reaction solution, and then hexane was added to filter the product. Hexane was removed from the filtered solution, and then the product was confirmed to be (tBu-O—(CH$_2$)$_6$)(CH$_3$)Si(C$_5$(CH$_3$)$_4$)(tBu-N)TiCl$_2$ compound (3), ([methyl(6-t-buthoxyhexyl)silyl(η5-tetramethylCp)(t-Butylamido)]TiCl$_2$), through $^1$H-NMR.

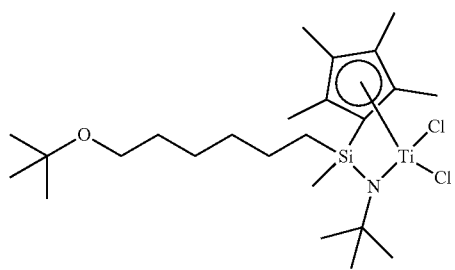

(3)

$^1$H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H).

Preparation of Supported Catalyst

Preparation Example 1: Preparation of Hybrid Supported Catalyst (A)

3.0 kg of toluene solution was added to a 20 L stainless steel (sus) high pressure reactor, and the reactor temperature was maintained at 40° C. 500 g of silica (SP2212, manufactured by Grace Davison) dehydrated at a temperature of 600° C. for 12 hours under vacuum was added to the reactor and sufficiently dispersed, and then 2.78 kg of a 10 wt % methylaluminoxane (MAO)/toluene solution was added thereto, followed by stirring at 200 rpm at 80° C. for 15 hours or more.

After lowering the reactor temperature to 40° C., 200 g of the first metallocene compound prepared in Synthesis Example 1/toluene solution (7.8 wt % in toluene) was added to the reactor and stirred at 200 rpm for 1 hour. Then, 250 g of the second metallocene compound prepared in Synthesis Example 2/toluene solution (7.8 wt % in toluene) was added to the reactor and stirred at 200 rpm for 1 hour.

70 g of a cocatalyst (anilinium tetrakis(pentafluorophenyl)borate) was diluted in toluene, and then added to the reactor, followed by stirring at 200 rpm for 15 hours or more. After lowering the reactor temperature to room temperature, the stirring was stopped, followed by settling for 30 minutes and decantation of the reaction solution.

The toluene slurry was transferred to a filter dryer and filtered. After adding 3.0 kg of toluene and stirring for 10 minutes, the stirring was stopped and filtration was performed. After adding 3.0 kg of hexane to the reactor and stirring for 10 minutes, the stirring was stopped and filtration was performed. It was dried under reduced pressure at 50° C. for 4 hours to prepare 500 g-SiO$_2$ supported catalyst (A).

Comparative Preparation Example 1: Preparation of Hybrid Supported Catalyst (B)

3.0 kg of toluene solution was added to a 20 L stainless steel (sus) high pressure reactor, and the reactor temperature was maintained at 40° C. 500 g of silica (SP2212, manufactured by Grace Davison) dehydrated at a temperature of 600° C. for 12 hours under vacuum was added to the reactor and sufficiently dispersed, and then 2.78 kg of a 10 wt % methylaluminoxane (MAO)/toluene solution was added thereto, followed by stirring at 200 rpm at 80° C. for 15 hours or more.

After lowering the reactor temperature to 40° C., 200 g of the first metallocene compound prepared in Synthesis Example 1/toluene solution (7.8 wt % in toluene) was added to the reactor and stirred at 200 rpm for 1 hour. Then, 220 g of the third metallocene compound prepared in Synthesis Example 3/toluene solution (7.8 wt % in toluene) was added to the reactor and stirred at 200 rpm for 1 hour.

70 g of a cocatalyst (anilinium tetrakis(pentafluorophenyl)borate) was diluted in toluene, and then added to the reactor, followed by stirring at 200 rpm for 15 hours or more. After lowering the reactor temperature to room temperature, the stirring was stopped, followed by settling for 30 minutes and decantation of the reaction solution.

The toluene slurry was transferred to a filter dryer and filtered. After adding 3.0 kg of toluene and stirring for 10 minutes, the stirring was stopped and filtration was performed. After adding 3.0 kg of hexane to the reactor and stirring for 10 minutes, the stirring was stopped and filtration was performed. It was dried under reduced pressure at 50° C. for 4 hours to prepare 450 g-SiO$_2$ supported catalyst (B).

Preparation of Ethylene/1-Hexene Copolymer

Example 1: Preparation of Ethylene/1-Hexene Copolymer

Under the conditions shown in Table 1 below, an ethylene/1-hexene copolymer was prepared using the hybrid supported metallocene catalyst (A) prepared in Preparation Example 1 in a uni-modal process with one polymerization reactor which is a hexane slurry stirred tank process polymerization reactor.

Example 2: Preparation of Ethylene/1-Hexene Copolymer

An ethylene/1-hexene copolymer of Example 2 was prepared in the same manner as in Example 1, except that the copolymerization process was performed under the conditions shown in Table 1 below.

Comparative Example 1

A commercially available ethylene/1-hexene (1-C6) copolymer (SP980, manufactured by LG Chem) prepared using a metallocene catalyst in a uni-modal process with a single polymerization reactor was prepared as Comparative Example 1.

Comparative Example 2

A commercially available ethylene/1-hexene (1-C6) copolymer (SP988, manufactured by LG Chem) prepared using a metallocene catalyst in a uni-modal process with a single polymerization reactor was prepared as Comparative Example 2.

Comparative Example 3

A commercially available ethylene/1-octene (1-C8) copolymer (Dowlex2344, manufactured by Dow) prepared using a Ziegler-Natta (Z/N) catalyst in a uni-modal process with a single polymerization reactor was prepared as Comparative Example 3.

Comparative Example 4

A commercially available ethylene/1-octene (1-C8) copolymer (Dowlex2355, manufactured by Dow) prepared using a metallocene catalyst in a bi-modal process with two or more polymerization reactors was prepared as Comparative Example 4.

Comparative Example 5

A commercially available ethylene/1-octene (1-C8) copolymer (Dowlex2388, manufactured by Dow) prepared using a metallocene catalyst in a bi-modal process with two or more polymerization reactors was prepared as Comparative Example 5.

Comparative Example 6: Preparation of Ethylene/1-Hexene Copolymer

An ethylene/1-hexene copolymer of Comparative Example 6 was prepared in the same manner as in Example 1, except that the copolymerization process was performed using the hybrid supported metallocene catalyst (B) prepared in Comparative Preparation Example 1 instead of the hybrid supported metallocene catalyst (A) prepared in Preparation Example 1 under the conditions shown in Table 1 below.

TABLE 1

| | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Catalyst or product name | Prep. Ex. 1 | Prep. Ex. 1 | SP 980 | SP 988 | Dowlex 2344 | Dowlex 2355 | Dowlex 2388 | Comp. Prep. Ex. 1 |
| Ethylene supply (kg/hr) | 31.8 | 3.7 | — | — | — | — | — | 32.0 |
| Comonomer | 1-hexene (1-C6) | 1-hexene (1-C6) | 1-hexene (1-C6) | 1-hexene (1-C6) | 1-octene (1-C8) | 1-octene (1-C8) | 1-octene (1-C8) | 1-hexene (1-C6) |
| Comonomer input compared to ethylene (wt %) | 8.2 | 5.2 | — | — | — | — | — | 6.4 |
| Hydrogen input (g/hr) | 4.5 | 2.0 | — | — | — | — | — | 3.2 |
| Polymerization temp. (° C.) | 93 | 93 | — | — | — | — | — | 93 |
| Catalytic activity (kgPE/g Cat · hr) | 5.0 | 8.0 | — | — | — | — | — | 7.2 |

In Table 1, catalytic activity (kgPE/gCat·hr) was obtained by measuring the weight of the catalyst used in the polymerization reaction of Examples and Comparative Examples and the weight of the polymer prepared from the polymerization reaction, and then calculating a ratio of the weight of the prepared polymer to the weight of the used catalyst.

Test Example 1

The physical properties of the ethylene/1-hexene copolymer or ethylene/1-octene copolymer according to Examples and Comparative Examples were measured in the following manner, and the results are shown in Table 2.

1) Density

The density of the ethylene/1-hexene copolymer was measured in accordance with ASTM D 1505.

2) Melt Index

The melt index ($MI_{2.16}$) was measured in accordance ASTM D 1238 (Condition E, 190° C., load 2.16 kg).

3) High Load Melt Index (HLMI)

The high load melt index ($MI_{21.6}$) was measured in accordance ASTM D 1238 (Condition E, 190° C., load 21.6 kg).

4) Melt Flow Rate Ratio (MFRR)

The melt flow rate ratio (MFRR, $MI_{21.6}/MI_{2.16}$) was obtained by dividing $MI_{21.6}$ (MI, load 21.6 kg) by $MI_{2.16}$ (MI, load 2.16 kg) using the melt index ($MI_{2.16}$) and the high load melt index ($MI_{21.6}$) measured above.

5) Molecular Weight Distribution (PDI, Polydispersity Index) and GPC Curve

The molecular weight distribution (PDI, Mw/Mn) was calculated by measuring a weight average molecular weight (Mw) and a number average molecular weight (Mn) using gel permeation chromatography (GPC, manufactured by Waters), and then dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polymer sample was pretreated by dissolving in 1,2,4-trichlorobenzene containing 0.0125% of BHT (2,6-bis(1,1-dimethylethyl)-4-methylphenol)) for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

6) BOCD Index and SCB Content

Specifically, the BOCD index was calculated based on the following Equation 1 through a molecular weight distribution curve obtained by plotting a log value (log M) of a weight average molecular weight (M) on the x-axis, and a molecular weight distribution (dwt/d log M) with respect to the log value on the y-axis, and then measuring the SCB (Short Chain Branch) content (content of branches having 2 to 7 carbon atoms per 1,000 carbons, unit: branch/1,000C) at the left and right borders of centered 60% area excluding 20% of the left and right ends in the total area.

In this regard, the SCB content at high molecular weight side and the SCB content at low molecular weight side mean SCB content values at the left and right borders of centered 60% area, respectively. The sample was pretreated by dissolving it in 1,2,4-Trichlorobenzene containing 0.0125% of BHT at 160° C. for 10 hours using PL-SP260, and then the SCB content was measured at 160° C. using a PerkinElmer Spectrum 100 FT-IR connected to a high-temperature GPC (PL-GPC220).

[Equation 1]

$$BOCD\ Index = \frac{(SCB\ content\ at\ high\ molecular\ weight\ side\ -\ SCB\ content\ at\ low\ molecular\ weight\ side)}{(SCB\ content\ at\ low\ molecular\ weight\ side)}$$

If the BOLD index is 0 or less, it can be considered that the polymer has no BOLD structure, and if the BOLD index is more than 0, it can be considered that the polymer has the BOLD structure. It can be evaluated that as a polymer has the higher value, it has more excellent BOLD characteristics.

7) Characteristic Stress (C.S, MPa)

The characteristic stress (C.S.) was measured by a tensile test of stress-strain in accordance with ASTM D 638.

Specifically, after obtaining a stress-strain curve by a tensile test under the following test conditions, yield stress and drawing stress were plotted according to a strain rate, and extrapolation was performed with the low strain rate. And, a value when the yield stress and the drawing stress are the same was measured as the characteristic stress.

Test: D638
Specimen: D638, Type IV
Strain rate: 0.1, 0.05, 0.01, 0.005 mm/mm s
Yield Stress: Stress at yield point
Drawing Stress: Stress at strain 100% (Dutile deformation)
x-axis: ln (strain rate)
y-axis: Stress.

8) Resistance to Internal Pressure (MPa)

The resistance to internal pressure (MPa) was measured by the ISO 9080 method.

9) Flexural Modulus (F.M.)

The flexural modulus (F.M., kg/cm$^2$) was measured in accordance with ASTM D 790.

10) Shear Viscosity

The shear viscosity was measured using a capillary at 210° C. and a shear rate of 1/1000 second. Specifically, the viscosity ($\eta_{1000}$, pa·s) was measured at a temperature of 210° C. and a shear rate of 1/1000 second using a RHEO-TESTER 2000 equipment manufactured from Gottfert with a die size of 10/2.

10) Processing Speed (m/min)

The processing speed (m/min) of each copolymer of Examples and Comparative Examples was measured by requesting Empur/GKS from Germany.

The results are shown in Table 2 below. In addition, a GPC curve (solid line, left Y-axis) and a SCB content graph (square dotted line, right Y-axis) of the copolymers prepared in Examples and Comparative Examples are shown in FIGS. 1 to 8, respectively.

TABLE 2

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Comonomer | 1-C6 | 1-C6 | 1-C6 | 1-C6 | 1-C8 | 1-C8 | 1-C8 | 1-C6 |
| Density (g/cm$^3$) | 0.932 | 0.9321 | 0.9371 | 0.9402 | 0.9318 | 0.9308 | 0.9405 | 0.932 |
| MI$_{2.16}$ (g/10 min) | 0.67 | 0.57 | 0.67 | 0.67 | 0.683 | 0.679 | 0.54 | 0.65 |
| HLMI (g/10 min) | 21.5 | 21.7 | 21.2 | 22.2 | 17.7 | 21 | 27.5 | 20.1 |
| MFRR | 32.1 | 38.1 | 31.6 | 33.1 | 25.9 | 30.9 | 50.9 | 30.9 |
| PDI | 3.67 | 4.83 | 3.83 | 4.08 | 3.38 | 3.38 | 5.87 | 3.47 |
| SCB (branch/1000 C.) | 10.6 | 11.9 | 6.8 | 5.7 | 8.8 | 9.3 | 7 | 11.5 |
| BOCD index | 8.3 | 8.7 | 3.4 | 2.6 | −0.5 | 3.2 | 3 | 7.1 |
| C.S. (MPa) | 11 | 11.7 | 9.78 | 12.6 | 11.7 | 10.9 | 12.4 | 10.9 |
| Resistance to internal pressure (MPa) | 8.94 | 9.24 | 8.7 | 9.5 | 9.05 | 8.83 | 9.77 | 8.83 |

TABLE 2-continued

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| F.M. (kg/cm$^2$) | 4750 | 4650 | 6500 | 7700 | 4750 | 4650 | 7300 | 4750 |
| $\eta_{1000}$ (pa·s) | 450 | 440 | 476 | 449 | 480 | 492 | 373 | 450 |
| Processing speed (m/min) | 27 | 30 | 27 | 30 | 22 | 23 | 30 | 24 |

As shown in Table 2, the ethylene/1-hexene copolymers of Examples 1 and 2 according to the present disclosure simultaneously had a high BOCD index and a low density with a broad molecular weight distribution compared to Comparative Examples. In addition, the copolymers had low flexural modulus with excellent strength due to high characteristic stress and pressure resistance, thereby improving flexibility in manufacturing a pipe. Further, they exhibited low shear viscosity and excellent processing speed, thereby achieving excellent flexibility and processability.

In addition, as shown in FIGS. 1 to 2, the ethylene/1-hexene copolymers of Examples 1 and 2 according to the present disclosure had a broad molecular weight distribution compared to Comparative Examples, and a structure in which comonomers are incorporated predominantly in high-molecular-weight main chains, that is, a structure in which the SCB (short chain branch) content increases as the molecular weight increases. However, it was confirmed that the ethylene/1-hexene copolymer or the ethylene/1-octene copolymer of Comparative Examples 1 to 6 could not simultaneously implement the BOCD structure and the broad molecular weight distribution as described above.

The invention claimed is:

1. An ethylene/1-hexene copolymer having a density measured according to ASTM D 1505 of 0.915 g/cm$^3$ to 0.935 g/cm$^3$, a broad orthogonal co-monomer distribution (BOCD) index of 5.5 or more, and a molecular weight distribution (Mw/Mn) of 3.5 to 5.

2. The ethylene/1-hexene copolymer of claim 1, wherein the broad orthogonal co-monomer distribution (BOCD) index is 5.5 to 10.

3. The ethylene/1-hexene copolymer of claim 1, wherein a SCB (short chain branch) content having 2 to 7 carbon atoms is 9.5 branches/1000C to 20 branches/1000C.

4. The ethylene/1-hexene copolymer of claim 1, wherein a melt index (MI$_{2.16}$) measured at 190° C. under a load of 2.16 kg in accordance with ASTM D 1238 is 0.50 g/10 min to 0.70 g/10 min.

5. The ethylene/1-hexene copolymer of claim 1, wherein a high load melt index (HLMI, MI$_{21.6}$) measured at 190° C. under a load of 21.6 kg in accordance with ASTM D 1238 is 20 g/10 min to 30 g/10 min.

6. The ethylene/1-hexene copolymer of claim 1, wherein a melt flow rate ratio (MI$_{21.6}$/MI$_{2.16}$) measured at 190° C. in accordance with ASTM D 1238 is 30 to 50.

7. The ethylene/1-hexene copolymer of claim 1, wherein a shear viscosity ($\eta_{1000}$) measured at 210° C. and a shear rate of 1/1000 second using a capillary is 420 Pa·s to 460 Pa·s.

8. The ethylene/1-hexene copolymer of claim 1, wherein a characteristic stress measured in accordance with ASTM D 638 is 10.0 MPa to 12.0 Mpa.

9. The ethylene/1-hexene copolymer of claim 1, wherein resistance to internal pressure measured in accordance with ISO 9080 is 8.3 MPa to 9.3 Mpa.

10. The ethylene/1-hexene copolymer of claim 1, wherein flexural modulus measured in accordance with ASTM D 790 is 4500 kg/cm$^2$ to 4800 kg/cm$^2$.

11. The ethylene/1-hexene copolymer of claim 1, wherein a 1-hexene content in the copolymer is 5 wt % to 10 wt % based on a total weight of the copolymer.

12. A method for preparing the ethylene/1-hexene copolymer according to claim 1, comprising:
copolymerizing ethylene and 1-hexene in a mono-modal polymerization process in the presence of a catalyst composition containing a first metallocene compound represented by the following Chemical Formula 1 and a second metallocene compound represented by the following Chemical Formula 2 while introducing hydrogen gas:

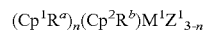 [Chemical Formula 1]

wherein, in Chemical Formula 1,
$M^1$ is a Group 4 transition metal;
each of Cp$^1$ and Cp$^2$ is cyclopentadienyl unsubstituted or substituted with C$_{1-20}$ hydrocarbyl;
R$^a$ and R$^b$ are the same as or different from each other, and are each independently hydrogen, C$_{1-20}$ alkyl, C$_{1-20}$ alkoxy, C$_{2-20}$ alkoxyalkyl, C$_{6-20}$ aryl, C$_{6-20}$ aryloxy, C$_{2-20}$ alkenyl, C$_{7-40}$ alkylaryl, C$_{7-40}$ arylalkyl, C$_{8-40}$ arylalkenyl, C$_{2-20}$ alkynyl, or substituted or unsubstituted C$_{2-20}$ heteroaryl containing at least one heteroatom selected from the group consisting of N, O and S, provided that at least one of R$^a$ and R$^b$ is not hydrogen;
Z$^1$ are each independently halogen, C$_{1-20}$ alkyl, C$_{2-20}$ alkenyl, C$_{7-40}$ alkylaryl, C$_{7-40}$ arylalkyl, C$_{6-20}$ aryl, substituted or unsubstituted C$_{1-20}$ alkylidene, substituted or unsubstituted amino, C$_{2-20}$ alkylalkoxy, or C$_{7-40}$ arylalkoxy; and
n is 1 or 0;

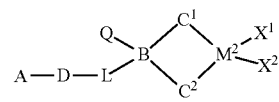 [Chemical Formula 2]

wherein, in Chemical Formula 2,
A is hydrogen, halogen, C$_{1-20}$ alkyl, C$_{2-20}$ alkenyl, C$_{6-20}$ aryl, C$_{7-20}$ alkylaryl, C$_{7-20}$ arylalkyl, C$_{1-20}$ alkoxy, C$_{2-20}$ alkoxyalkyl, C$_{3-20}$ heterocycloalkyl, or C$_{5-20}$ heteroaryl;
D is —O—, —S—, —N(R)—, or —Si(R)(R')—, wherein R and R' are the same or different from each other, and are each independently hydrogen, halogen, C$_{1-20}$ alkyl, C$_{2-20}$ alkenyl, or C$_{6-20}$ aryl;
L is C$_{1-10}$ linear or branched alkylene;
B is carbon, silicon, or germanium;
Q is hydrogen, halogen, C$_{1-20}$ alkyl, C$_{2-20}$ alkenyl, C$_{6-20}$ aryl, C$_{7-20}$ alkylaryl, or C$_{7-20}$ arylalkyl;
M$^2$ is a Group 4 transition metal;
X$^1$ and X$^2$ are the same as or different from each other, and are each independently halogen, C$_{1-20}$ alkyl, C$_{2-20}$ alkenyl, $C_{6-20}$ aryl, nitro, amido, $C_{1-20}$ alkylsilyl, $C_{1-20}$ alkoxy, or $C_{1-20}$ sulfonate; and $C^1$ and $C^2$ are the same as or different from each other, and are each independently represented by one of Chemical Formula 2a, Chemical Formula 2b, or Chemical Formula 2c, except that both of $C^1$ and $C^2$ are represented by Chemical Formula 2c;

[Chemical Formula 2a]

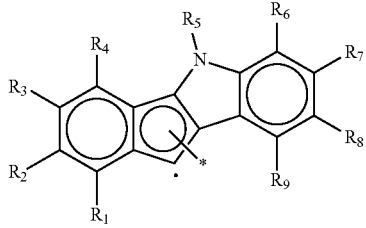

[Chemical Formula 2b]

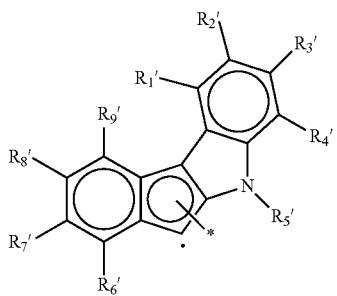

[Chemical Formula 2c]

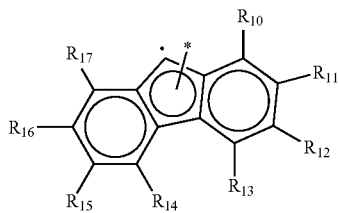

wherein, in Chemical Formulae 2a, 2b, and 2c, $R_1$ to $R_{17}$ and $R_1'$ to $R_9'$ are the same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{6-20}$ alkylaryl, or $C_{7-20}$ arylalkyl, and two or more adjacent $R_{10}$ to $R_{17}$ may be connected with each other to form a substituted or unsubstituted aliphatic or aromatic ring;

· represents a site of binding to B; and

* represents a site of binding to $M^2$.

13. The method for preparing the ethylene/1-hexene copolymer of claim 12, wherein $R^a$ and $R^b$ in Chemical Formula 1 are each independently hydrogen, $C_{1-10}$ alkyl, $C_{2-20}$ alkoxyalkyl, or $C_{7-20}$ arylalkyl, and at least one of $R^a$ and $R^b$ is —$(CH_2)_p$—$OR^c$, wherein $R^c$ is a linear or branched alkyl group having 1 to 6 carbon atoms, and p is an integer of 2 to 4.

14. The method for preparing the ethylene/1-hexene copolymer of claim 12, wherein the first metallocene compound and the second metallocene compound are included in a molar ratio of 1:2 to 1:5.

15. The method for preparing the ethylene/1-hexene copolymer of claim 12, wherein the copolymerization is performed by the mono-modal polymerization process in a single loop slurry reactor.

16. The method for preparing the ethylene/1-hexene copolymer of claim 12, wherein the 1-hexene is included in an amount of 5 wt % to 15 wt % based on a total weight of the ethylene monomer in the copolymerization.

17. A pipe comprising the ethylene/1-hexene copolymer according to claim 1.

* * * * *